(12) United States Patent
Burge et al.

(10) Patent No.: US 8,024,596 B2
(45) Date of Patent: Sep. 20, 2011

(54) PERSONAL WIRELESS NETWORK POWER-BASED TASK DISTRIBUTION

(75) Inventors: Benjamin D. Burge, Shaker Heights, OH (US); Ronald N. Isaac, Shrewsbury, MA (US); Joji Ueda, Cambridge, MA (US)

(73) Assignee: Bose Corporation, Framingham, MA (US)

( * ) Notice: Subject to any disclaimer, the term of this patent is extended or adjusted under 35 U.S.C. 154(b) by 758 days.

(21) Appl. No.: 12/111,567

(22) Filed: Apr. 29, 2008

(65) Prior Publication Data

US 2009/0271639 A1  Oct. 29, 2009

(51) Int. Cl.
*G06F 1/00* (2006.01)
*G06F 1/26* (2006.01)
*G06F 1/32* (2006.01)
*G06F 9/46* (2006.01)

(52) U.S. Cl. ........ 713/340; 713/300; 713/320; 718/104; 718/105; 718/106

(58) Field of Classification Search .................. 713/300, 713/320, 340; 718/104, 105, 106
See application file for complete search history.

(56) References Cited

U.S. PATENT DOCUMENTS

| | | | |
|---|---|---|---|
| 6,026,303 A | 2/2000 | Minamisawa | |
| 6,684,339 B1 * | 1/2004 | Willig | 713/300 |
| 6,834,192 B1 | 12/2004 | Watanabe et al. | |
| 6,928,264 B2 | 8/2005 | Botteck | |
| 7,193,991 B2 | 3/2007 | Melpignano et al. | |
| 7,222,166 B2 | 5/2007 | Treister et al. | |
| 7,694,160 B2 * | 4/2010 | Esliger et al. | 713/320 |
| 7,715,790 B1 | 5/2010 | Kennedy | |
| 7,899,397 B2 | 3/2011 | Kumar | |
| 2001/0012757 A1 | 8/2001 | Boyle | |
| 2003/0018696 A1 | 1/2003 | Sanchez et al. | |
| 2003/0054765 A1 | 3/2003 | Botteck | |
| 2004/0044718 A1 | 3/2004 | Ferstl et al. | |
| 2004/0128382 A1 | 7/2004 | Shimoda et al. | |
| 2005/0033816 A1 | 2/2005 | Yamaguchi et al. | |
| 2005/0278520 A1 * | 12/2005 | Hirai et al. | 713/1 |
| 2006/0072525 A1 | 4/2006 | Hillyard et al. | |

(Continued)

FOREIGN PATENT DOCUMENTS

EP  1548985 A1  6/2005

(Continued)

OTHER PUBLICATIONS

International Preliminary Report on Patentability dated Nov. 11, 2010 for PCT/US2009/038782.

(Continued)

*Primary Examiner* — Mark Connolly

(57) ABSTRACT

Apparatus and method for dynamically reassigning between a plurality of personal portable devices in a wireless network one or more task portions of a task that have been distributed among the personal portable devices in response to at least one of the personal portable devices having diminishing access to electric power. A reassignment of a particular task routine among the personal portable devices may he forestalled as a result of it being impermissible to transmit a copy of a task routine associated with a task portion and/or a piece of data associated with that task routine from one of the personal portable devices to another. A task portion reassigned between two personal portable devices may be associated with communications between personal portable devices and its reassignment may result in a changing in topological positions of the two personal portable devices within the topology of the wireless network.

34 Claims, 12 Drawing Sheets

U.S. PATENT DOCUMENTS

| | | | |
|---|---|---|---|
| 2006/0129637 A1 | 6/2006 | Yoshida | |
| 2006/0270395 A1 | 11/2006 | Dhawan et al. | |
| 2007/0254728 A1* | 11/2007 | Moallemi et al. | 455/574 |
| 2007/0294408 A1 | 12/2007 | Jackson | |
| 2008/0043824 A1* | 2/2008 | Jacobs et al. | 375/220 |
| 2009/0275367 A1* | 11/2009 | Reinisch et al. | 455/572 |

FOREIGN PATENT DOCUMENTS

| | | | |
|---|---|---|---|
| EP | 1624628 | A2 | 2/2006 |
| WO | 0103379 | A1 | 1/2001 |
| WO | 03007552 | A2 | 1/2003 |
| WO | 03084192 | A1 | 10/2003 |
| WO | 2006028547 | A1 | 3/2006 |
| WO | 2007121476 | A1 | 10/2007 |
| WO | 2007127878 | A1 | 11/2007 |

OTHER PUBLICATIONS

International Preliminary Report on Patentability dated Oct. 25, 2010 for PCT/US2009/039310.

International Preliminary Report on Patentability dated Jun. 10, 2010 for PCT/US2009/039309.

International Search Report and Written Opinion dated Aug. 20, 2009 for PCT/US2009/038782.

International Search Report and Written Opinion dated Sep. 15, 2009 for PCT/US2009/039309.

International Search Report and Written Opinion dated Aug. 21, 2009 for PCT/US2009/039310.

Basu et al., A Novel Approach for Execution of Distributed Tasks on Mobile Ad Hoc Networks, Wireless Communications and Networking Conference, 2002, IEEE, Piscataway, NJ, vol. 2, Mar. 17, 2002, pp. 579-585.

Duran-Limon et al., A Resource and QoS Management Framework for a Real-Time Event System in Mobile Ad Hoc Environments, Object-Oriented Real-Time Dependable Systems, 2003, The Ninth IEEE International Workshop on Anacapri, Italy, Piscataway, NJ, pp. 217-217.

Singh et al., Electing Leaders Based Upon Performance: the Delay Model, International Conference on Distributed Computing Systems, Arlington, TX, 1991, IEEE vol. Conf. 11, pp. 464-471.

Yen et al., A Genetic Algorithm for Energy-Efficient Based Multicast Routing on MANETS, Computer Communications, Elsevier Science Publishers BV, Amsterdam, NL, vol. 31, No. 10, 2008, pp. 2632-2641.

* cited by examiner

PERSONAL WIRELESS NETWORK POWER-BASED TASK DISTRIBUTION

FIELD

This description relates to distributing portions of a task among multiple personal portable devices in a personal wireless network in response to amounts of electric power available to each device.

BACKGROUND

It has become commonplace for people carry a multitude of personal portable devices capable of interacting in a personal wireless network (e.g., cell phones, PDAs, PIMs, MP3 players, PNDs, digital cameras, wireless headsets, wireless earpieces, wireless microphones, etc.) that they employ in combination to carry out a task where each device is assigned a portion of that task. Such tasks include listening to music, watching a video, engaging in a telephone conversation, reading emails, exchanging text messages, etc. Such personal portable devices are meant to be easily movable from place to place by being easily carried on the persons of their users in some way (e.g., in a pocket, strapped to an arm or wrist, worn over the head or around the neck, clipped to a belt, etc.).

To be so easily movable, such personal portable devices are usually provided with electric power stored in rechargeable batteries. However, to also be easily carried on a user's person, the physical size and weight of such devices is usually kept to a minimum, which necessarily restricts the capacity of such rechargeable batteries. As a result, such users of personal portable devices must recharge each of such devices on a regular basis. The length of the intervals of time between each instance of recharging for each personal portable device depends on a number of factors, including battery capacity, frequency of use, the duration of each use and what each device is being used for. As a result, the intervals of time between each instance of recharging for each such device can vary greatly between devices, even where all of those devices are used together by the same user.

Differences in intervals of time between instances of recharging between different personal portable devices can present users who employ a multitude of such devices in combination to perform a particular task with frequent instances where differing ones of those devices have electric power available to carry out a portion of that task while others have either run out or are about to run out. The result can be recurring instances where the user discovers that the task cannot be performed, because one of that user's personal portable devices is without sufficient electric power to perform the portion of the task that is normally assigned to it.

SUMMARY

Apparatus and method for dynamically reassigning between a plurality of personal portable devices in a wireless network one or more task portions of a task that have been distributed among the personal portable devices in response to at least one of the personal portable devices having diminishing access to electric power. A reassignment may be prompted by the remaining electric power available to one of the personal portable devices diminishing to a predetermined level, and/or it may be prompted as a result of a goal of causing the remaining operating times of the personal portable devices engaged in performing the task to be as close to equal as possible. A reassignment may be prompted by the remaining electric power available to one of the personal portable devices being changed either by the coupling of that personal portable device to an external power supply or by a suspension of execution of a task routine associated with a task portion that had been assigned to that personal portable device. A reassignment of a particular task routine between two of the personal portable devices may be forestalled as a result of it being impermissible to transmit a copy of a task routine associated with a task portion and/or a piece of data associated with that task routine from one of the two personal portable devices to the other. A task portion reassigned between two personal portable devices may be associated with communications between personal portable devices and its reassignment may result in a changing in topological positions of the two personal portable devices within the topology of the wireless network.

In one aspect, a personal portable device is assigned to perform a first task portion and a second task portion of a task comprising a plurality of task portions. The personal portable device comprises a wireless transceiver to enable communications across a wireless network with another personal portable device, a processor, and a storage in which is stored a first power routine comprising a sequence of instructions. When the sequence of instructions of the first power routine is executed by the processor, the processor is caused to monitor a remaining amount of electric power available to the personal portable device from a power source, and operate the wireless transceiver to signal the other personal portable device through the wireless network with a request to reassign execution of at least one of a first task routine stored in the storage that corresponds to the first task portion and a second task routine stored in the storage that corresponds to the second task portion in response to the remaining amount of electric power available to the personal portable device from the power source diminishing to a predetermined level.

Implementations may include, and are not limited to, one or more of the following features. The storage may store a first power data indicating a first rate of consumption of electric power associated with executing the first task routine and a second rate of consumption of electric power associated with executing the second task routine. The first and second rates may be derived by the processor from observations of rates of electric power consumption during execution of the first and second task routines, and/or the processor may be caused to select one of the first and second task portions to be reassigned in response to the results of comparing the first and second rates. The processor may be further caused to select one of the first and second task portions to be reassigned to the other personal portable device depending on whether the resulting decrease in rate of power consumption for the personal portable device and the resulting increase in rate of power consumption for the other personal portable device caused by reassigning the first task portion or the second task portion results in smallest difference in remaining operating times of these two personal portable devices. The processor may be further caused to receive a signal from the other personal portable device indicating acceptance of the request to reassign execution of at least one of the first and second task routines to the other personal portable device; determine the identity of the other personal portable device; determine whether it is permissible to transmit a copy of either the first or second task routines and/or a copy of either of a first data associated with the first task routine or a second data associated with the second task routine; and transmit a copy of the first task routine in response to it being permissible to transmit the first, but not the second, and/or the first data to the other personal portable device while not transmitting a copy of the second task routine and/or the second data in response to it being permissible to transmit the first, but not the second. The second task routine may be an audio processing routine that would cause the processor to alter a characteristic of a piece of audio data, and the second data may be a piece of audio data. The processor may be further caused to receive a signal from the other personal portable device indicating acceptance of the request to reassign execution of at least one of the first and second task routines to the other personal portable device, and transmit a signal to the other personal portable device through the network to coordinate a commencement of execution of another task routine analogous to the first task routine by a processor of the other personal portable device with a cessation of execution of the first task routine by the processor of the personal portable device.

In one aspect, a method comprises causing a first processor of a first personal portable device to execute a first sequence of instructions of a first task routine stored in a first storage of the first personal portable device and associated with a first task portion of a task having a plurality of task portions distributed among at least the first personal portable device and a second personal portable device linked by a wireless network, causing the first processor to execute a second sequence of instructions of a second task routine stored in the first storage and associated with a second task portion of the task, monitoring a remaining amount of electric power available to the first personal portable device from a first power source, and causing the first personal portable device to signal at least the second personal portable device through the wireless network with a request to reassign execution of at least one of the first task routine and the second task routine in response to the remaining amount of electric power available to the first personal portable device from the first power source diminishing to a first predetermined level.

Implementations may include, and are not limited to, one or more of the following features. The method may further comprise comparing rates of consumption of the remaining amount of electric power available to the first personal portable device due the first processor executing the first and second task routines, and selecting to reassign execution of one or the other of the first and second task routines to the second personal portable device based on which causes a greater rate of electric power consumption. The wireless network may have either a chain topology or a star topology, and the method may further comprise reassigning a task routine causing a processor of one personal portable device to communicate across the wireless network with another personal portable device to be reassigned with the result that at least two personal portable devices within the wireless network are caused to change positions within the wireless network, and the task may be that of audibly outputting differing audio channels of a piece of audio by each personal portable device of the at least two personal portable devices. The method may further comprise causing the second personal portable device to accept the request of the first personal portable device to reassign execution of at least one of the first and second task routines to the second personal portable device in response to a suspension of execution of a third task routine by a processor of the second personal portable device.

The method may further comprise monitoring a remaining amount of electric power available to the second personal portable device from a second power source, and providing information concerning that consumption to the first personal portable device through the wireless network. The method may then further comprise selecting to reassign one or the other of the first and second task portions to the second personal portable device based depending on whether the resulting decrease in rate of power consumption for the first personal portable device and the resulting increase in rate of power consumption for the second personal portable device caused by reassigning the first task portion or the second task portion results in smallest difference in remaining operating times of the first and second personal portable devices. Alternatively and/or additionally, the method may then further comprise causing the second personal portable device to request that execution of at least one task routine be reassigned in response to the remaining amount of electric power available to the second personal portable device diminishing to a second predetermined level. Alternatively and/or additionally, the method may then further comprise causing the second personal portable device to request reassignment of at least one task routine to the second personal portable device in response to the remaining amount of electric power available to the second personal portable device changing as a result of the second personal portable device being coupled to an external power source.

The method may further comprise comparing identities of the first and second personal portable devices; determining whether it is permissible to transmit a copy of either the first or second task routines and/or a copy of either of a first data associated with the first task routine or a second data associated with the second task routine from the first personal portable device to the second personal portable device; and so transmitting a copy of the first task routine in response to it being permissible to transmit the first, but not the second, and/or the first data to the other personal portable device while not transmitting a copy of the second task routine and/or the second data in response to it being permissible to transmit the first, but not the second. The second task routine may be an audio processing routine that would cause the processor to alter a characteristic of a piece of audio data, and the second data may be a piece of audio data.

DESCRIPTION OF DRAWINGS

FIG. 4b is a block diagram depicting a more specific example of the reassignment of FIG. 4a.

FIG. 4c is a block diagram depicting a different reassignment of a task portion between the personal portable devices in the network of FIG. 4a.

DESCRIPTION

Figure 1A:
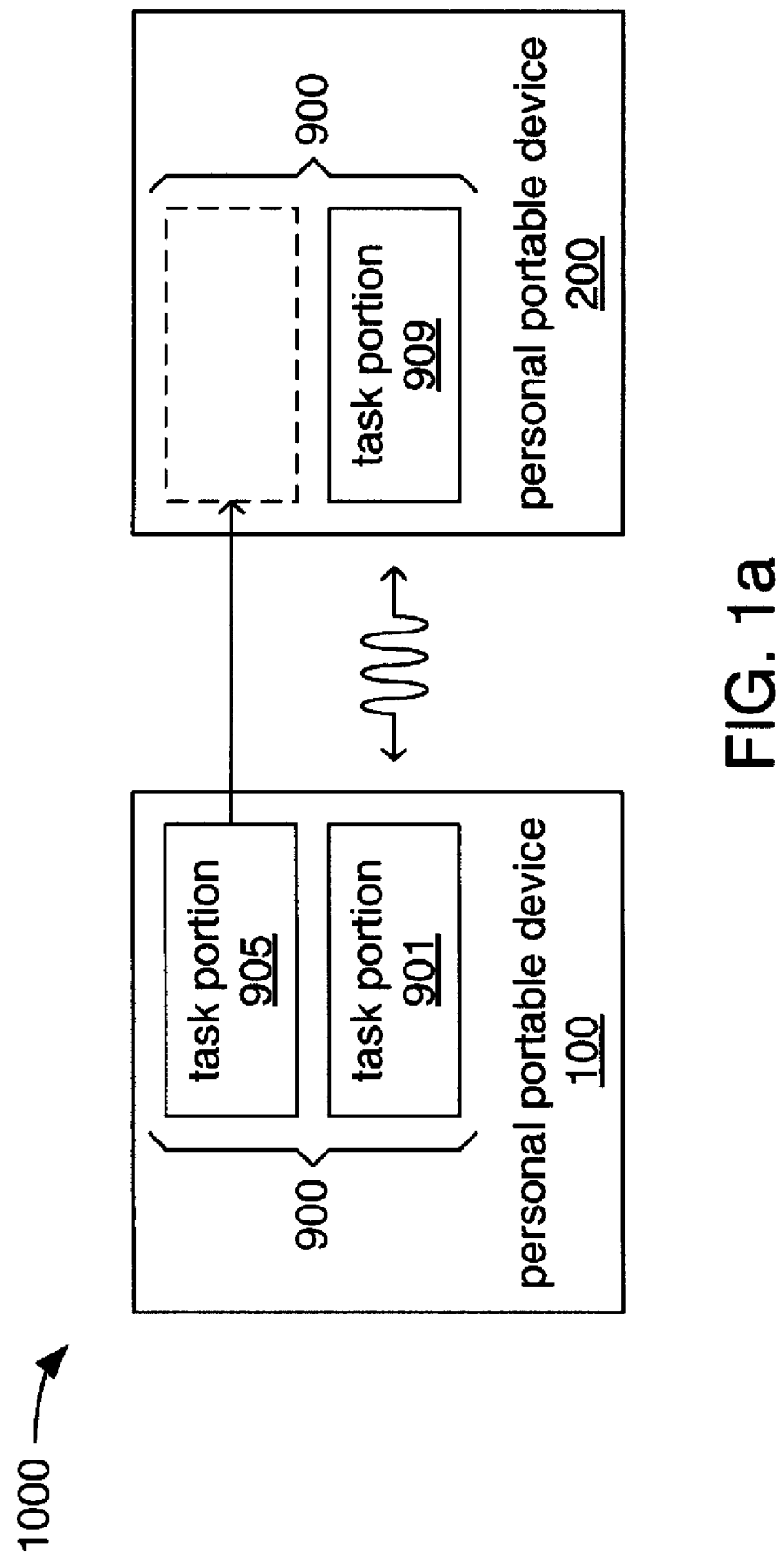
FIG. 1a is a block diagram depicting a reassignment of a task portion between two personal portable devices in a network.
Figure 1B:
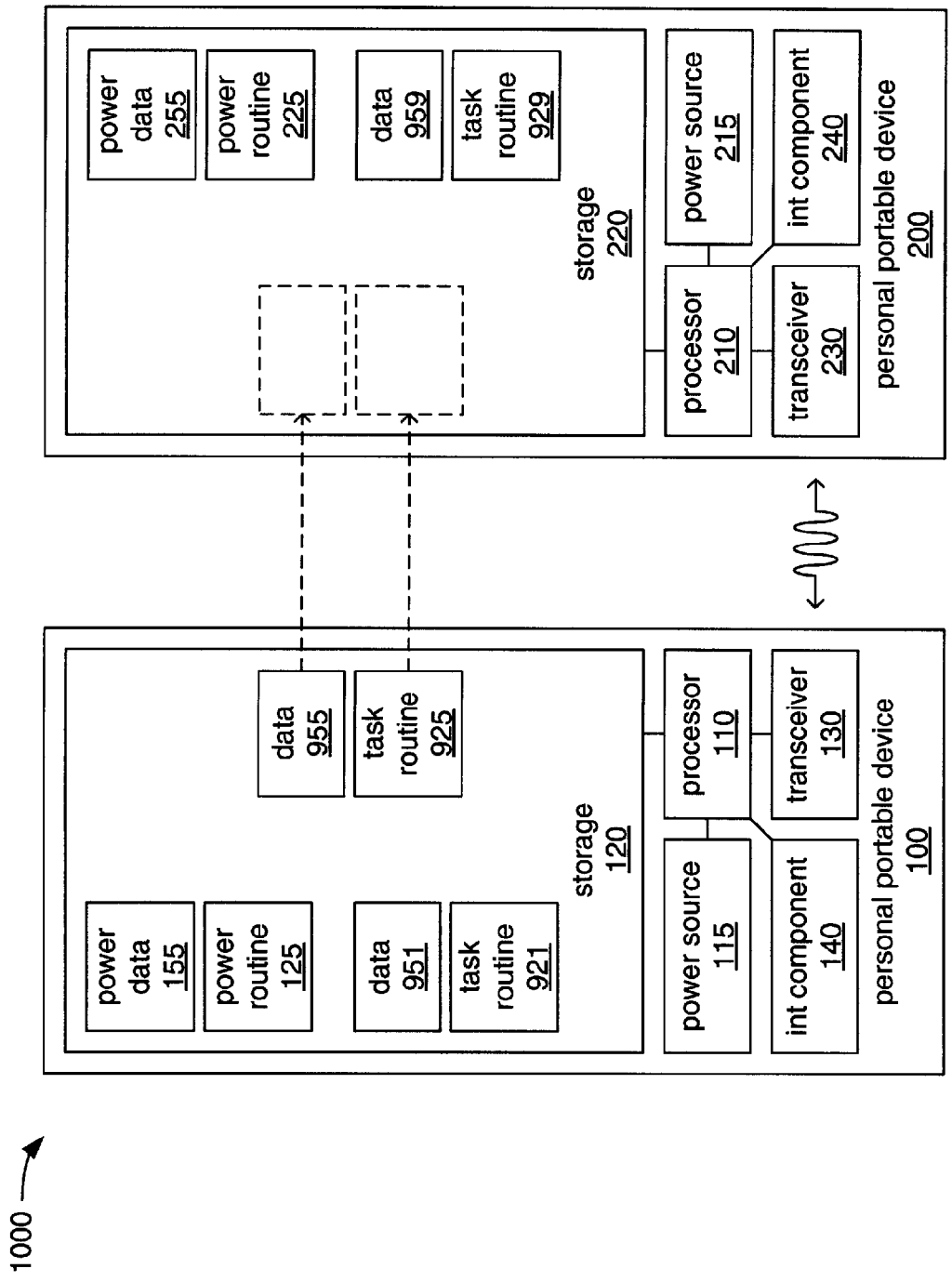
FIG. 1b is a block diagram of internal architectures of the two personal portable devices of the network of FIG. 1a depicting a reassignment of execution of a task routine between the two personal portable devices.

FIGS. 1a and 1b are block diagrams that, taken together, depict the manner in which a personal portable device 100 and a personal portable device 200 wirelessly linked in a network 1000 cooperate to perform a task 900. FIG. 1a depicts the division of the task 900 into task portions 901, 905 and 909, and how these task portions are distributed among the personal portable devices 100 and 200. FIG. 1b depicts aspects of possible internal architectures of the personal portable devices 100 and 200, and how the distribution of task portions depicted in FIG. 1a corresponds to a possible distribution of routines and data among the personal portable devices 100 and 200. FIGS. 1a and 1b also depict the reassignment of the task portion 905 from the personal portable device 100 to the personal portable device 200, and the possible manner in which that reassignment is effected as an example of the reassignment of a portion of the task 900 in response to diminishing availability of electric power.

Each of the personal portable devices 100 and 200 may be any of a variety of types personal portable devices, including and not limited to, personal data assistants (PDAs), personal information managers (PIMs), personal navigation devices (PNDs), cellular telephones, MP3 audio file players, MPEG video file players, digital cameras, wireless headsets, wireless earpieces, and wireless microphones. The nature of the task 900 that the personal portable devices 100 and 200 cooperate to perform necessarily depends on the capabilities of each of the personal portable devices 100 and 200, and how the user of the personal portable devices 100 and 200 chooses to use them together. By way of example, the personal portable devices 100 and 200 may be a cellular telephone and a wireless in-ear headset, respectively, and the task 900 may be the playing of recorded audio stored on the personal portable device 100 through the personal portable device 200. By way of another example, the personal portable devices 100 and 200 may be a wireless data storage device and a wireless data terminal, respectively, and the task 900 may be the searching and editing of data stored on the personal portable device 100 by a user controlling the search and making the edits through the personal portable device 200. In both cases, the perspective of a user of both of the personal portable devices 100 and 200 may be that a single task is being performed. However, those skilled in the art will readily recognize that what may appear to a user to simply be a single task (e.g., the task 900) often involves multiple subtasks, or portions of the task (e.g., the task portions 901, 905 and 909), that must each be performed for the task to be performed.

The personal portable device 100 incorporates a processor 110, a power source 115, a storage 120, a transceiver 130 and an interactive component 140. The processor 110 has access to the power source 115 to monitor available power, has access to the storage 120 to access various routines and data, has access to the transceiver 130 to engage in wireless communications, and has access to the interactive component 140 to enable interaction between the personal portable device 100 and a user. The power source 115 provides power for the operation of one or more of the processor 110, the storage 120, the transceiver 130 and the interactive component 140. Similarly, the personal portable device 200 incorporates a processor 210, a power source 215, a storage 220, a transceiver 230 and an interactive component 240. The processor 210 has access to the power source 215 to monitor available power, has access to the storage 220 to access various routines and data, has access to the transceiver 230 to engage in wireless communications, and has access to the interactive component 240 to enable interaction between the personal portable device 200 and a user. The power source 215 provides power for the operation of one or more of the processor 210, the storage 220, the transceiver 230 and the interactive component 240.

Each of the power sources 115 and 215 may be any of a variety of possible types of power source, including and not limited to, a battery, AC mains, and a DC supply provided by another device (not shown) to which the personal portable devices 100 and 200, respectively, are coupled. However, given the portable nature of the personal portable devices 100 and 200, is likely that the power sources 115 and 215 are electric power storage devices such as batteries, and therefore, each has a finite capacity for storing a charge of electric power. The processors 110 and 210 are able to monitor the power sources 115 and 215, respectively, to determine how much of electric power remains stored in each.

Each of the storages 120 and 220 may be based on any of a wide variety of information storage technologies, including and not limited to, static RAM, dynamic RAM, ROM of either erasable or non-erasable form, FLASH, magnetic memory, ferromagnetic disk storage, phase-change storage or magneto-optical storage. Each of the storages 120 and 220 are able to store varying quantities and types of routines and data to be accessed by the processors 110 and 210, respectively. However, as will be explained in more detail, as part of distributing the task portions 901, 905 and 909 among the personal portable devices 100 and 200, the storage 120 stores at least task routines 921 and 925 in addition to storing a power routine 125, and the storage 220 stores at least a routine 929 in addition to storing a power routine 225. Each of the power routines 125 and 225, as well as each of the task routines 921, 925 and 929, incorporate one or more sequences of instructions. As will also be explained in more detail, each of the routines 125, 225, 921, 925 and 929 (i.e., both task and power routines) may be accompanied by data 155, 255, 951, 955 and 959, respectively. It is preferred that the storages 120 and 220 be at least partially based on some form of non-volatile storage technology to prevent the loss of at least some of their contents when deprived of power.

Each of the transceivers 130 and 230 may employ any of a number of wireless communications technologies to enable wireless communications between the personal portable devices 100 and 200, and thereby enable the formation of the network 1000. Such technologies by which formation of the network 1000 may be enabled include and are not limited to, infrared, ultrasound, skin conductance, and radio frequency (RF) signals. Where RF signals are employed, the frequencies of those signals and various aspects of the protocols and the transfers of commands and data may be selected to conform to any of a variety of wireless networking standards, including and not limited to, the Bluetooth specification promulgated by the Bluetooth Special Interest Group of Bellevue, Wash., and one of the variety of forms of wireless local area network (WLAN) promulgated by the Institute of Electrical and Electronics Engineers, Inc. (IEEE®) of Piscataway, N.J., in at least the IEEE 802 series of standards. Regardless of the exact nature of the technology or standards employed in the communications between the personal portable devices 100 and 200 via the transceivers 130 and 230, such communications enable coordination between the personal portable devices 100 and 200 in cooperating to perform the task 900.

Each of the interactive components 140 and 240 may be any of a variety of types of component enabling the personal portable devices 100 and 200, respectively, to interact with the user of the personal portable devices 100 and 200. Such types of component include, and are not limited to, buttons, switches, touch sensors, indicator lamps, alphanumeric displays, video displays, acoustic drivers, microphones, and temperature sensors. Types of interactions that may be supported by one or both of the interactive components 140 and 240 include, and are not limited to, detecting user input through manual operation of controls, detecting audio for recordation and/or transmission to another personal portable device, audibly outputting audio from an audio recording and/or received from another personal portable device, and capturing or displaying visual imagery. The type of component for each of the interactive components 140 and 240 is necessarily linked to what type of device each of the personal portable devices 100 and 200 are. By way of example, where the personal portable device 100 is a cellular telephone, then the interactive component 140 is necessarily at least a combination of manually-operable controls, a visual display, a microphone and an acoustic driver to enable a user of the personal portable device 100 to dial a phone number, view status information regarding a phone conversation, and both talk to and hear another person in a phone conversation. By way of another example, where the personal portable device 200 is a wireless earphone, the interactive component 240 is necessarily at least an acoustic driver to audibly output whatever audio the user of the personal portable device 200 is listening to, and may further be a manually-operable control to adjust the volume or other characteristic of that audible output.

Each of the processors 110 and 210 may be any of a variety of types of processing device, including and not limited to, a general purpose processor, a digital signal processor or other more specialized processor having a limited instruction set optimized for a given range of functions, a microcontroller or combinational logic. The processor 110 is able to access each of the power routine 125 and the task routines 921 and 925 to retrieve sequences of instructions that when executed by the processor 110, cause the processor 110 to perform various tasks, as will be described. Similarly, the processor 210 is able to access each of the power routine 225 and the task routine 929 to also retrieve sequences of instructions that when executed by the processor 210, cause the processor 210 to perform various tasks, as will be similarly described.

As previously discussed, the task 900 is divided into the task portions 901, 905 and 909, and these task portions are distributed among the personal portable devices 100 and 200, which employ the network 1000 of which they are each a part to coordinate their separate performances of the ones of these task portions that are assigned to each of them. In this way, the personal portable devices 100 and 200 cooperate to perform the task 900 as directed by the user of the personal portable devices 100 and 200. Initially, the task portions 901 and 905 are assigned to the personal portable device 100, and the task portion 909 is assigned to the personal portable device 200. This initial assignment of task portions may be carried out in any of a number of ways, including and not limited to, the user of the personal portable devices 100 and 200 having operated these personal portable devices to so assign these task portions.

However, as has also been previously discussed, the very portable nature of the personal portable devices 100 and 200 likely results in the power sources 115 and 215, respectively, being power storage devices of some form such as batteries capable of storing only a finite amount of electric power, and thereby requiring the power sources 115 and 215 to be recharged on a recurring basis. Further, given the tendency of many users to use different personal portable devices at different times and for different durations of time, it is likely that each of the power sources 115 and 215 will have their stored amounts of electric power diminished to differing degrees at any given time and will become depleted at different times. As a result, it is likely that the amount of electric power remaining in one of the power sources 115 and 215 will be substantially more diminished than the other during the performance of the task 900. In such instances, the personal portable devices 100 and 200 cooperate to attempt to at least forestall the loss of ability to continue performing the task 900 by reassigning a portion of the task 900 from the one of the personal portable devices 100 and 200 with less remaining electric power to the other these personal portable devices that has more remaining electric power.

Therefore, as depicted in FIGS. 1a and 1b, the task portion 905 is reassigned from the personal portable device 100 to the personal portable device 200 in response to a diminishing amount of electric power remaining stored in the power source 115. This leaves the personal portable device 100 to perform the task portion 901 without the higher rate of power consumption from also performing the task portion 905, thereby increasing the remaining operating time of the personal portable device 100. In some embodiments, where the task portion 901 is also able to be reassigned to the personal portable device 200, such a reassignment may occur at a later time when the amount of electric power remaining in the power source 115 has been diminished still further. However, in other embodiments, where the task portion 901 is not able to be reassigned to the personal portable device 200, performance of the task 900 may simply be forced to cease once the amount of electric power remaining in the power source 115 has diminished to the extent that the personal portable device 100 loses power.

The task portions 901, 905 and 909 are associated with task routines 921, 925 and 929, respectively. Therefore, as a result of the initial assignment of the task portions 901 and 905 to the personal portable device 100, the processor 110 initially accesses the storage 120 to execute sequences of instructions of the task routines 921 and 925, thereby causing the processor 110 to perform the task portions 901 and 905. Similarly, as a result of the initial assignment of the task portion 909 to the personal portable device 200, the processor 210 initially accesses the storage 220 to execute a sequence of instructions of the routine 929, thereby causing the processor 210 to perform the task portion 909. However, the processors 110 and 210 also access the storages 120 and 220 to execute sequences of instructions of the power routines 125 and 225, respectively. In so doing, the processors 110 and 210 are caused to monitor the amount of electric power remaining in each of the power sources 115 and 215, respectively, and are caused to cooperate to effect a reassignment of one or more of the task portions 901, 905 and 909 in response to the amounts of electric power remaining in the power sources 115 and 215.

In some embodiments, the processor 110 is caused by the power routine 125 to signal the processor 210 with a request to transfer a portion of the task 900 from the personal portable device 100 to the personal portable device 200 in response to detecting that the amount of electric power stored within the storage 115 has diminished to a predetermined threshold, and likewise, the processor 210 is caused by the power routine 225 to signal the processor 110 with a similar request in response to similar circumstances. The predetermined thresholds for each of the processors 110 and 210 may be maintained as part of power data 155 and 255 stored in the storages 120 and 220, respectively. The power data 125 and/or the data 225 may further maintain indications of which of the routines task 921, 925 and 929 are made up of sequences of instructions that can be executed by the processor 110 and which can be executed by the processor 210, to thereby distinguish routines that may be reassigned between the processors 110 and 210 from routines that cannot. Alternatively, the task routines 921, 925 and/or 929 may, themselves, incorporate indications of which of the processors 110 and 210 are able to and/or are permitted to execute their sequences of instructions.

In some embodiments, the processor 110 is caused by the power routine 125 to calculate the remaining amount of operating time for the personal portable device 100 that the amount of electric power remaining in the power source 115 is able to support before being substantially depleted, and the processor 210 is caused by the power routine 225 to also perform a similar calculation for the personal portable device 200. The processors 110 and/or 210 are further caused to compare the remaining operating times for both of the personal portable devices 100 and 200, and where a difference of a predetermined amount of time is reached, the processors 110 and/or 210 are caused to cooperate to reassign one or more of the task routines 921, 925 and 929 between them. The power data 125 and/or the power data 225 may further maintain estimations and/or recorded observations of the rate at which each of the task routines 921, 925 and/or 929 diminish remaining available electric power in one or both of the power sources 115 and 215 as an aid to the calculations of operating times, and/or as an aid in determining which of the task routines 921, 925 and/or 929 are to be reassigned based on those rates. It may be that to the extent possible, the processors 110 and 210 reassign one or more of the task routines 921, 925 and 929 more than once as needed to attempt to maintain a desired balance of the remaining amounts of operating time between the personal portable devices 100 and 200.

Regardless of when or how a determination is made by one or both of the processors 110 and 210 that one or more of the task routines 921, 925 and 929 are to be reassigned, the manner in which such a reassignment is carried out may vary depending on various details of the personal portable devices 100 and 200. By way of example, where the task routine 925 is to be reassigned from having its sequences of instructions executed by the processor 110 to having its sequences of instructions executed by the processor 210, as depicted, the sequences of instructions of the task routine 925 may be copied from the storage 120 to the storage 220 through the network 1000. In this way, the location of the sequences of instructions of the task routine 925 that are to be executed follow the reassignment of the corresponding task 905. Copying of sequences of instructions of the task routine 925 between the personal portable devices 100 and 200 may be done where the sequences of instructions are compatible with both of the processors 110 and 210 such that either of the processors 110 and 210 are able to execute them. Further, whether or not such copying of sequences of instructions of the task routine 925 may be done may depend on what restrictions are imposed by a license associated with the task routine 925 that may either permit or disallow such copying. In determining whether or not such copying is permitted, the personal portable device 100 may first determine the identity of the second personal portable device 200, as there may be certain personal portable device to which such copying may be permissible and others to which such copying may not be. A factor of the identity of the personal portable device 200 that may determine whether or not such copying is permissible may be the identity of the manufacturer of the personal portable device 200 or of some component of the personal portable device 200.

As an alternative to such copying, reassignment of the task 905 may be implemented by the processor 110 simply ceasing to execute sequences of instructions of one form of the task routine 925 stored in the storage 120 while the processor 210 begins executing sequences of instructions of a corresponding form of the task routine 925 stored in the storage 220. This provision and selective use of two corresponding forms of the task routine 925 stored in each of the storages 120 and 220 may be necessary where neither form of the task routine 925 is made up of sequences of instructions that are compatible with both of the processors 110 and 210, and/or where licensing restrictions preclude the above-described copying of a single form of the task routine 925.

Regardless of how the transfer of execution of sequences of instructions of the task routine 925 between the processors 110 and 210 is effected, the data 955 that may accompany the task routine 925 by being copied between the storages 100 and 200, and whether or not this is done may depend on the nature of the task portion 905 that execution of sequences of instructions of the task routine 925 causes to be performed. As those skilled in the art will readily recognize, limitations in compatibility of sequences of instructions between the processors 110 and 210 and limitations imposed by licensing restrictions impeding the copying of the task routine 925 do not necessarily apply where the copying of the data 955 is concerned. Indeed, depending on the nature of the data 955, there may be entirely different applicable licensing limitations on copying to consider.

Figure 2A:
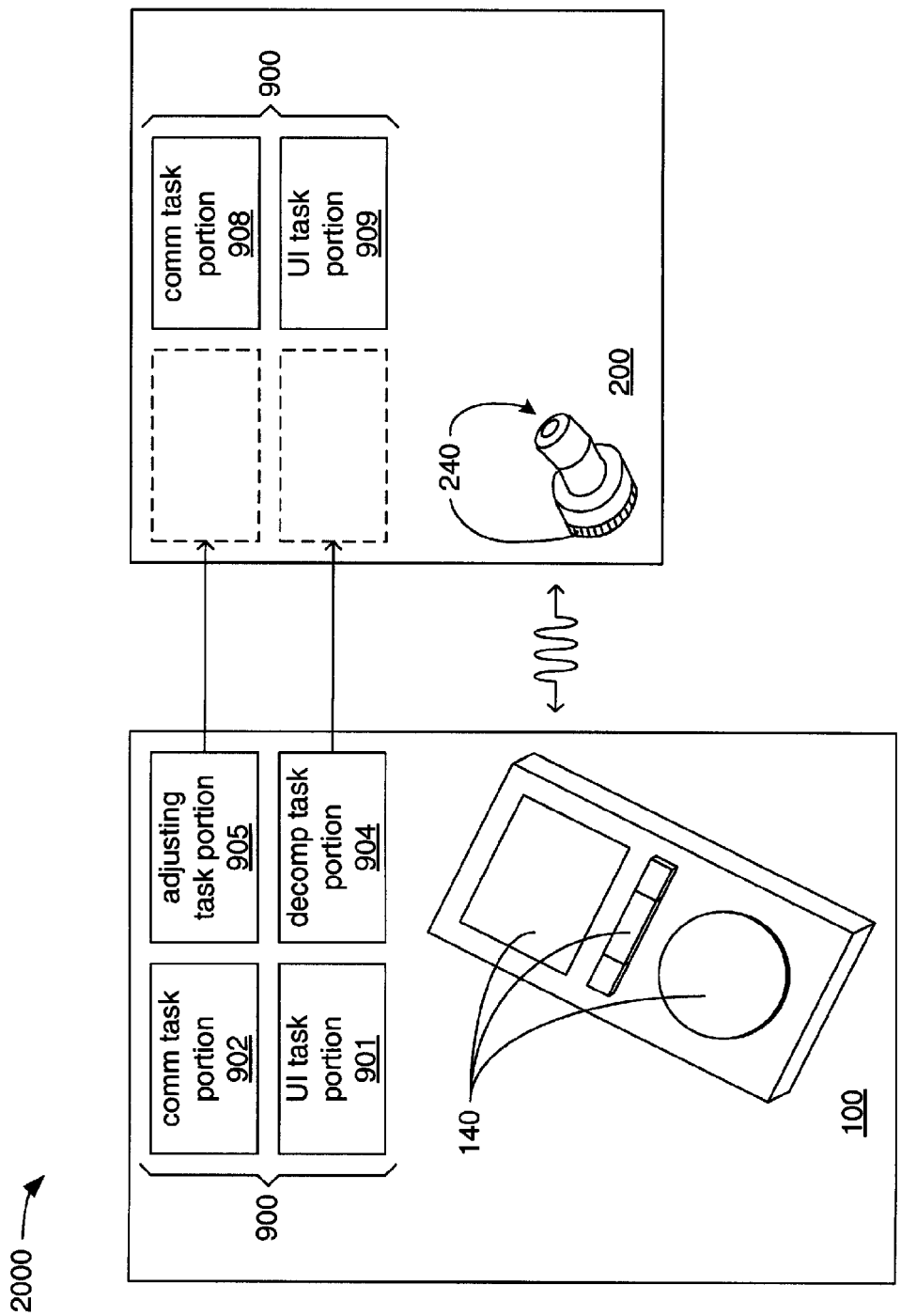
FIG. 2a is a block diagram depicting a reassignment of a task portion between two personal portable devices in another network.
Figure 2B:
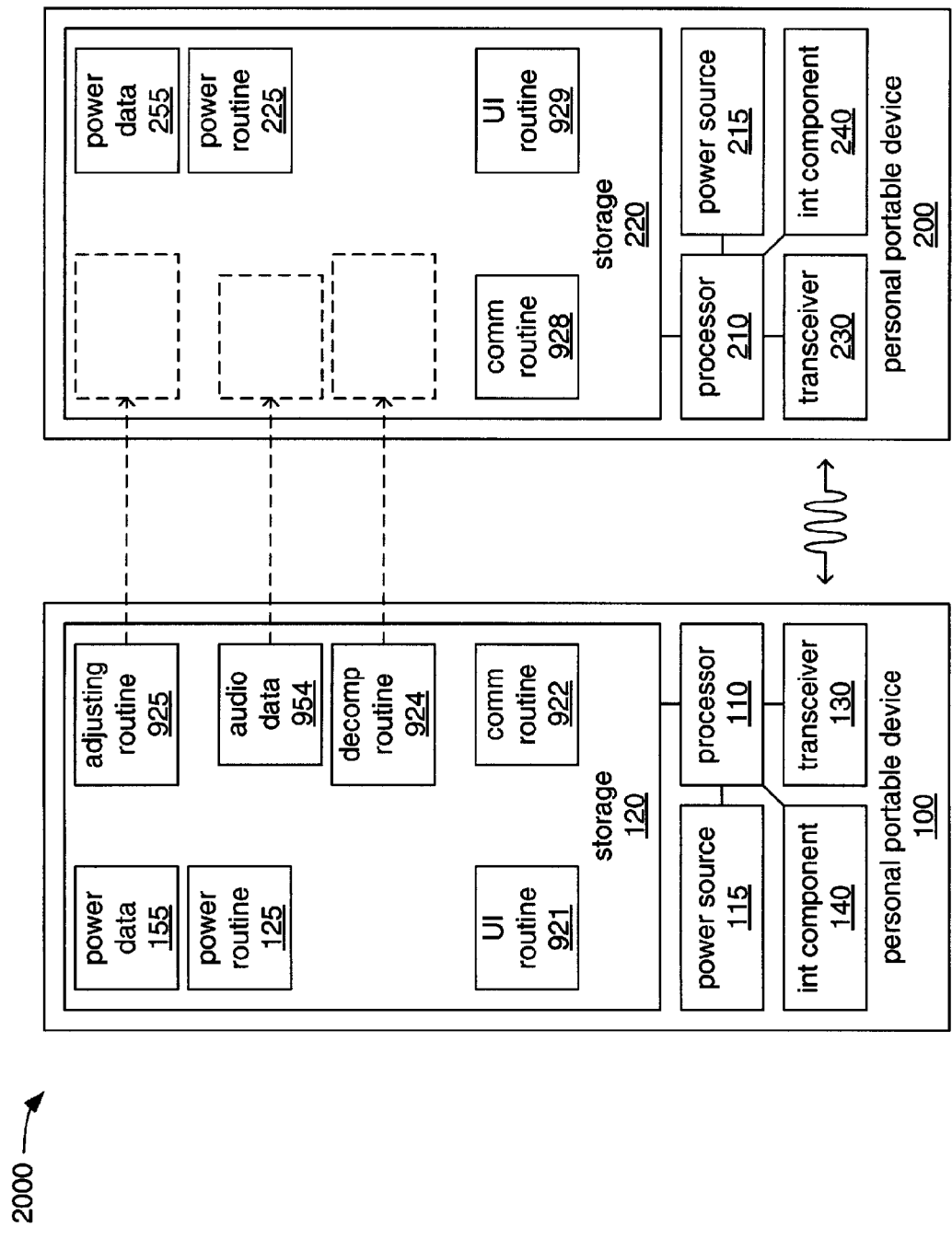
FIG. 2b is a block diagram of internal architectures of the two personal portable devices of the network of FIG. 2a depicting a reassignment of execution of a task routine between the two personal portable devices.

FIGS. 2a and 2b are block diagrams that, taken together, depict the manner in which a personal portable device 100 and a personal portable device 200 wirelessly linked in a network 2000 cooperate to perform a task 900 of audibly outputting audio data stored within the personal portable device 100 through the personal portable device 200, including cooperating to reassign one or more portions of the task 900 in response to diminishing electrical power available to the personal portable device 100. FIG. 2a depicts the division of the task 900 into various task portions, and how these task portions are distributed among the personal portable devices 100 and 200. FIG. 2b depicts aspects of possible internal architectures of the personal portable devices 100 and 200, and how the distribution of assignments of task portions corresponds to a possible distribution of assignments of routines and data among the personal portable devices 100 and 200. FIGS. 2a and 2b also depict the reassignment of the task portions from the personal portable device 100 to the personal portable device 200, and the corresponding reassignment of routines.

Each of the personal portable devices 100 and 200 may be any of a variety of types personal portable devices. However, the FIGS. 2a and 2b and the discussion that follows are meant to provide a more specific example of reassigning portions of a more specific task between more specific forms of the personal portable devices 100 and 200 than was discussed in more general terms with regard to the personal portable devices 100 and 200 of FIGS. 1a and 1b. Therefore, as depicted, the personal portable device 100 is a hand-holdable device appropriate for storing audio data (e.g., a MP3 player, a MPEG video file player, or a digital camera), and the personal portable device 200 is a device in the form of an earpiece that is appropriate for audibly outputting audio provided by the personal portable device 100. Due to numerous correspondences of features between FIGS. 1a and 1b, and FIGS. 2a and 2b, numerous identical numeric labels have been used.

Not unlike the personal portable device 100 of FIGS. 1a and 1b, the personal portable device 100 of FIGS. 2a and 2b incorporates a storage 120, a transceiver 130 and an interactive component 140, one or more of which are accessible by a processor 110 and/or powered by a power source 115 that are also both incorporated into the personal portable device 100. Similarly, not unlike the personal portable device 200 of FIGS. 1a and 1b, the personal portable device 200 of FIGS. 2a and 2b incorporates a storage 220, a transceiver 230 and an interactive component 240, one or more of which are accessible by a processor 210 and/or powered by a power source 215 that are also both incorporated into the personal portable device 200. Again, each of the processors 110 and 210, the power sources 115 and 215, the storages 120 and 220, the transceivers 130 and 230, and the interactive components 140 and 240 may be based on any of a variety of technologies. However, in embodiments in which the personal portable device 100 is of a form appropriate for storing audio data, and in which the personal portable device 200 is of a form appropriate for audibly outputting audio, the interactive component 140 likely incorporates at least one manually-operable control and possibly a visual display to enable selection of audio data, and the interactive component 240 likely incorporates at least one acoustic driver to enable audible output.

In a manner not unlike the task 900 of FIGS. 1a and 1b, the task 900 of audibly outputting audio stored on the personal portable device 100 through the personal portable device 200 is divided up into a user interface task portion 901, a communications task portion 902, a decompression task portion 904 and an adjusting task portion 905 initially assigned to be performed by the personal portable device 100; and into a communications task portion 908 and a user interface task portion 909 initially assigned to be performed by the personal portable device 200. Not unlike the task portions and routines assigned to the personal portable devices 100 and 200 in FIGS. 1a and 1b, among the personal portable devices 100 and 200 of FIGS. 2a and 2b, the user interface task portion 901, the communications task portion 902, the decompression task portion 904, the adjusting task portion 905, the communications task portion 908 and the user interface task portion 909 correspond to various task routines, specifically, a user interface routine 921, a communications routine 922, a decompression routine 924, an adjusting routine 925, a communications routine 928 and a user interface routine 929, respectively.

Therefore, as a result of the aforedescribed division and assignment of portions of the task 900, the processor 110 is initially assigned to execute sequences of instructions of the user interface routine 921, the communications routine 922, the decompression routine 924 and the adjusting routine 925, while the processor 210 is initially assigned to execute sequences of instructions of the communications routine 928 and the user interface routine 929. As will be explained in greater detail, as a result of diminishing electric power remaining in the power source 115 of the personal portable device 100, one or both of the decompression task portion 904 and the adjusting task portion 905 are reassigned to the personal portable device 200. As a result, either through the copying of one or both of the decompression routine 924 and the adjusting routine 925 from the personal portable device 100 to the personal portable device 200, or through a combination of cessation of execution of sequences of instructions by the processor 110 and coordinated commencement of execution of sequences of instructions by the processor 210 of analogous forms of one or both of the decompression routine 924 and the adjust routine 925, the processor 210 is caused to take over the performance of the decompression task portion 904 and/or the adjusting task portion 905.

In performing the portions of the task 900 initially assigned to the personal portable device 100, the processor 110 is caused by the user interface routine 921 to operate the interactive component 140 to monitor one or more manually-operable controls of the interactive component 140 for an indication from a user that a piece of audio stored in the storage 120 as audio data 954 is to be audibly output to the user through an acoustic driver of the interactive component 240. In response to receiving this indication, the processor 110 is caused by the decompression routine 924 to decompress the audio data 954, and is caused by the adjusting routine 925 to make various adjustments to one or more characteristics of the resulting decompressed audio data. Such adjustments may include tonal adjustments, balancing of different audio channels, equalization adjustments, etc. The processor 110 is then further caused by the communications routine 922 to operate the transceiver 130 to transmit the resulting decompressed and adjusted audio to the personal portable device 200. The processor 210 is caused by the communications routine 928 to operate the transceiver 230 to receive the transmitted audio from the personal portable device 100. The processor 210 is further caused by the user interface routine 929 to operate the interactive component 240 to cause at least one acoustic driver of the interactive component 240 to audibly output the received audio with whatever adjustment to the volume that the user may have indicated via a manually-operable control of the interactive component 240 that the processor 210 has been caused to monitor. In some embodiments, such indicated volume adjustments are transmitted to the personal portable device 100 to be carried out by the adjusting routine 925. In other embodiments, the processor 210 may effect the indicated volume adjustments on the received audio data, itself.

In this way, the processors 110 and 210 have been caused to perform various ones of the portions of the task 900 that have been assigned to each of the personal portable devices 100 and 200, and are thereby caused to cooperate to perform the entirety of the task 900. However, as those skilled in the art will readily recognize, the performance of the task portions 901, 902, 904, 905, 908 and 909 (which correspond to the execution of sequences of instructions of each of the routines 921, 922, 924, 925, 928 and 929, respectively) consumes electric power. Further and as previously discussed, the portable nature of the personal portable devices 100 and 200 likely results in the power sources 115 and 215 each being a form of battery (or other electric power storage) able to store a finite amount of electric power and requiring recharging. As the processors 110 and 210 execute sequences of instructions to perform the task 900, the processors 10 and 210 also execute sequences of instructions of power routines 125 and 225 to monitor amounts of electric power remaining in the power sources 115 and 215, respectively.

Therefore, as depicted in FIGS. 2a and 2b, where the processor 100 has been caused by the power routine 125 to determine that the amount of electric power remaining in the power source 115 has been sufficiently diminished, the processor 110 is caused to cooperate with the processor 210 to cause one or both of the task portions 904 and 905 to be reassigned from the personal portable device 100 to the personal portable device 200. This leaves the personal portable device 100 to perform the remaining task portions, thereby reducing the rate of consumption of whatever amount of electric power remains in the power source 115. Which of the task portions 904 and 905 are reassigned to the personal portable device 200, if not both, may be determined based on the rate at which the performance of each consume electric power, and these rates may either be calculated by the processor 110 or may be provided to the processor 110 as power data 155 stored in the storage 120.

In some embodiments, there may be a goal of trying to continue the performance of the task 900 for as long as possible with the hope that the user of both of the personal portable devices 100 and 200 will recharge the power sources 115 and 215 before remaining electric power in one or the other is diminished to the extent that that task 900 can only be performed with various limitations or can no longer be performed, at all. In such embodiments, the processors 110 and 210 are caused by the power routines 125 and 225, respectively, to cooperate so that one or both of the task portions 904 and 905 are transferred to the personal portable device 200 based on a determination of which transfers would result in the personal portable devices 100 and 200 having remaining operating times that are as close to equal as possible. This determination may result from calculations performed to determine the actual rate at which remaining electric power in each of the power sources 115 and 215 are being consumed, and how long the remaining amounts of power can last. Alternatively, information concerning the consumption of electric power by performing the task portions 904 and 905 may be stored as the power data 155 and/or as power data 255. As those skilled in the art will readily recognize, one of the decompression task portion 904 and the adjusting task portion 905 may require substantially more electric power to be performed than the other, depending on the quantity and type of processor operations required by each.

Regardless of the exact manner in which the choice of task portions to transfer is made, subsequent evaluations of remaining operating times for each of the personal portable devices 100 and 200 may result in changes to which of the task portions 904 and 905 are reassigned between the personal portable devices 100 and 200. Where one or the other of the personal portable devices 100 and 200 are capable of performing other tasks unrelated to the task 900, the use of one or both of the personal portable devices 100 and 200 for one of those unrelated tasks may diminish available electric power remaining in one or the other of the power sources 115 and 215 so as to necessitate such subsequent evaluations. Further, the user may couple one or both of the personal portable devices 100 and 200 to an external power source (not shown) that provides an alternative source of electric power for performing the task 900 and/or recharges one or both of the power sources 115 and 215 so that such subsequent evaluations are necessitated. As a result of such subsequent evaluations, one or both of the task portions 204 and 205 may be reassigned back to the personal portable device 100. In other words, the reassignment of the task portions 204 and 205 between the personal portable devices 100 and 200 may be dynamic based on changing availability of electric power to each.

Dynamic reassignment of task portions between the personal portable device 100 and 200 may also be prompted by the suspension of one or more task portions. Depending on the nature of the task 900, the user may have the option of choosing to forgo one or more task portions that the user deems to be unnecessary or undesirable to perform. By way of example, the user may choose to make no use of the abilities offered by the adjusting routine 925 to modify one or more characteristics of the decompressed audio, or in other words, the user may provide an indication of desiring to "bypass" making adjustments to the audio to be audibly output. In this case, execution of sequences of instructions of the adjusting routine 925 is suspended such that electric power is no longer being consumed to perform such adjustments to the decompressed audio. Such a suspension of execution of sequences of instructions of a routine may prompt an evaluation of remaining operating times of the personal portable devices 100 and 200, and/or a reassignment of task portions, especially where power management is directed at attempting to keep the operating times of the personal portable devices 100 and 200 as equal is possible.

Other factors may influence which of the task portions 904 and 905 are able to be reassigned between the personal portable devices 100 and 200. By way of example, the processor 210 may be sufficiently limited in its processing capabilities that the processor 210 is unable to execute the sequences of instructions of one or the other of the decompression routine 924 and the adjusting routine 925 quickly enough to effectively perform one or the other of the corresponding task portions 904 and 905. By way of another example, the storage 220 may be sufficiently limited in capacity that one or the other of the decompression routine 924 and the adjusting routine 925 cannot be stored in the storage 220 to enable the processor 210 to access them. By way of still another example, the sequences of instructions making up the decompression routine 924 and the adjusting routine 925 may be incompatible with the processor 210 such that the processor 210 is unable to execute them. By way of yet another example, it may not be permissible under a licensing agreement applicable to one or both of the decompression routine 924 and the adjusting routine 925 to permit their sequences of instructions to be executed by any other processor than the processor 110, and indeed, this may be the basis on which the processor 110 was assigned the task portions 904 and 905, initially. It may also be that execution of sequences of instructions of one or the other of the routines 924 and 925 of other processors of certain other personal portable devices is permitted, but that none of such personal portable devices is present in the network 2000.

Where the reassignment of at least one of the decompression task portion 904 and the adjusting task portion 905 is not prevented and is carried out, one or more task portions that are not deemed essential to achieving continued audible output of the audio stored as the audio data 954 may cease being performed by either of the personal portable devices 100 and 200 to further conserve available electric power. This may be triggered as a result of one or both of the power sources 115 and 215 being diminished to an extent even greater than what may have initially triggered the reassignment of one or both of the task portions 904 and 905. By way of example, the processor 210 may cease executing sequences of instructions of the user interface routine 929 by which the processor 210 is caused to monitor the interactive component 240 for indications that the user has operated a manually-operable control of the interactive component 240 to change the volume of the audible output. Instead, either the last known volume setting provided by the user is maintained, or a fixed default volume level is maintained (perhaps a fixed default volume level selected to require minimal processing to maintain). By way of another example, instead of reassigning the adjusting task portion 205, both of the processors 110 and 210 may simply cease executing any sequences of instructions of the adjusting routine 925, thereby ceasing to make any of the adjustments to the decompressed audio that results from the execution of sequences of instructions of the decompression routine 924. In this way, audio is still audibly output to the user, but without the same degree of control over its characteristics as before.

Where available electric power remaining in the power source 115 continues to be diminished to the extent that the processor 110 is caused by the power routine 125 to determine that failure of the personal portable device 100 to continue to function is approaching relatively quickly, then the processor 110 may be caused to cooperate to copy some portion of the audio data 954 to the storage 220 of the personal portable device 200. In this way, the personal portable device 200 may still be able to perform the task 900 in some limited way and/or for some limited time after the personal portable device 100 has failed due to lack of electric power. However, as those skilled in the art will readily recognize, such copying of the audio data 954 may be prohibited by licensing arrangements and/or copyright considerations.

Figure 3A:
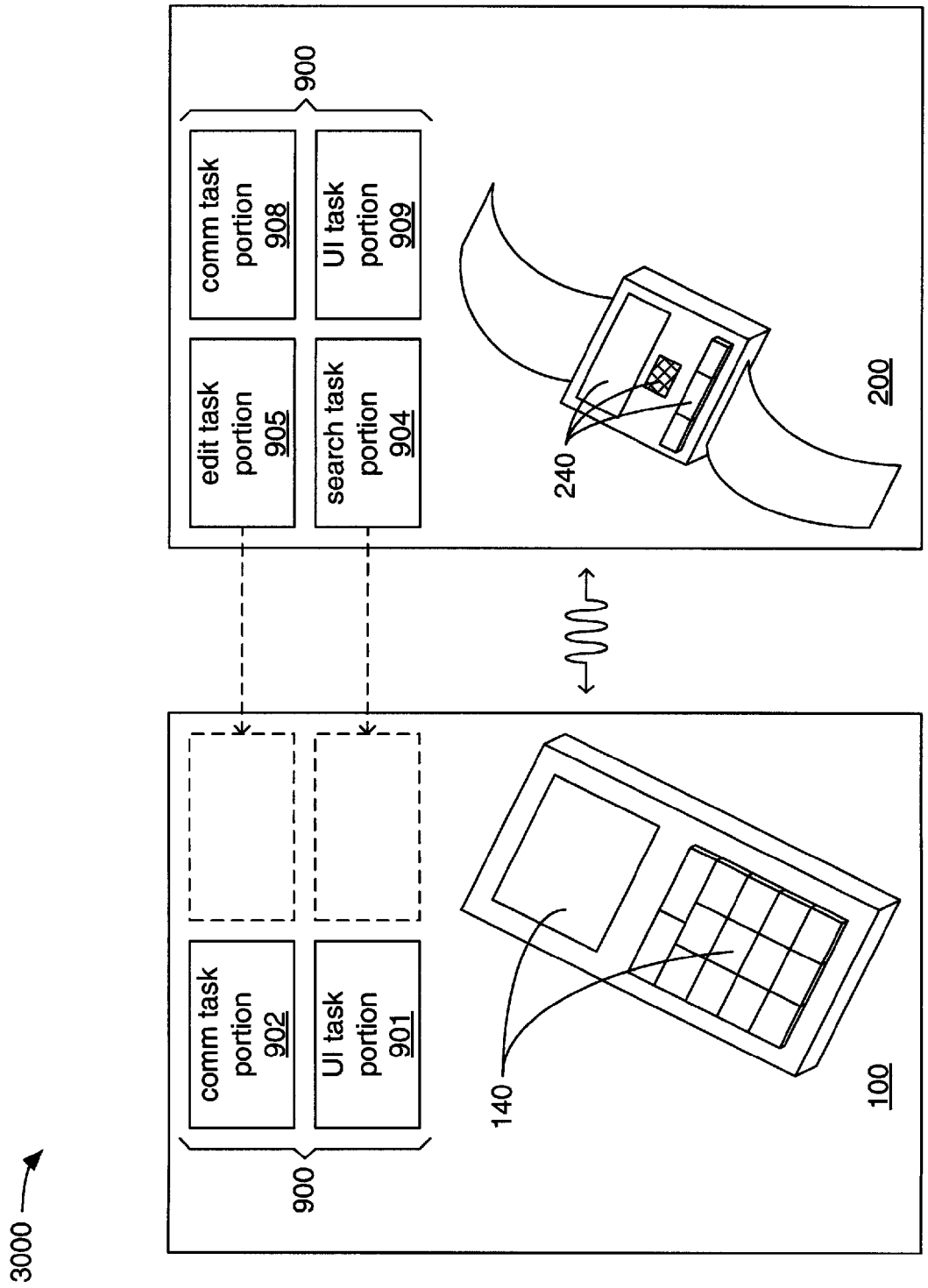
FIG. 3a is a block diagram depicting a reassignment of a task portion between two personal portable devices in still another network.
Figure 3B:
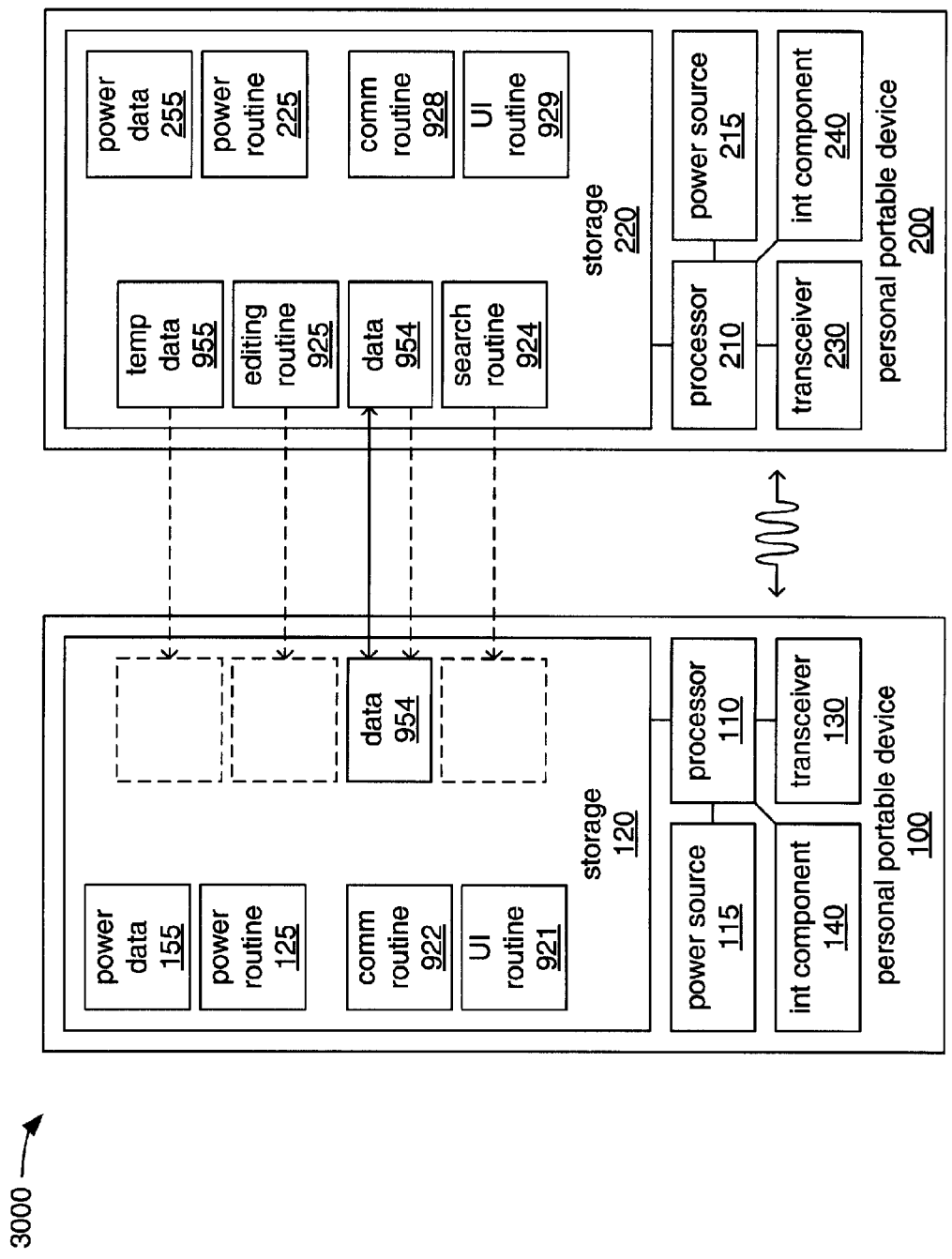
FIG. 3b is a block diagram of internal architectures of the two personal portable devices of the network of FIG. 3a depicting a reassignment of execution of a task routine between the two personal portable devices.

FIGS. 3a and 3b are block diagrams that, taken together, depict the manner in which a personal portable device 100 and a personal portable device 200 wirelessly linked in a network 3000 cooperate to perform a task 900 of editing data stored within the personal portable device 100 through the personal portable device 200, including cooperating to reassign one or more portions of the task 900 in response to diminishing electrical power available to the personal portable device 200. FIG. 3a depicts the division of the task 900 into various task portions, and how these task portions are distributed among the personal portable devices 100 and 200. FIG. 3b depicts aspects of possible internal architectures of the personal portable devices 100 and 200, and how the distribution of assignments of task portions corresponds to a possible distribution of assignments of routines and data among the personal portable devices 100 and 200. FIGS. 3a and 3b also depict the reassignment of the task portions from the personal portable device 200 to the personal portable device 100, and the corresponding reassignment of routines in response to diminishing availability of electric power to the personal portable device 100.

Each of the personal portable devices 100 and 200 may be any of a variety of types personal portable devices. However, not unlike FIGS. 2a and 2b, FIGS. 3a and 3b, as well as the discussion that follows, are meant to provide a more specific example of reassigning portions of a specific task between specific forms of the personal portable devices 100 and 200. Therefore, as depicted, the personal portable device 100 is a hand-holdable device appropriate for storing data (e.g., a PDA, a PIM, a PND, or a cellular telephone), and the personal portable device 200 is a wrist-worn device appropriate for editing data stored in the personal portable device 100. Due to numerous correspondences of features between FIGS. 1a and 1b, and FIGS. 3a and 3b, numerous identical numeric labels have been used.

Not unlike the personal portable device 100 of FIGS. 1a and 1b, the personal portable device 100 of FIGS. 3a and 3b incorporates a storage 120, a transceiver 130 and an interactive component 140, one or more of which are accessible by a processor 110 and/or powered by a power source 115 that are also both incorporated into the personal portable device 100. Similarly, not unlike the personal portable device 200 of FIGS. 1a and 1b, the personal portable device 200 of FIGS. 3a and 3b incorporates a storage 220, a transceiver 230 and an interactive component 240, one or more of which are accessible by a processor 210 and/or powered by a power source 215 that are also both incorporated into the personal portable device 200. Again, each of the processors 110 and 210, the power sources 115 and 215, the storages 120 and 220, the transceivers 130 and 230, and the interactive components 140 and 240 may be based on any of a variety of technologies. However, in embodiments in which the personal portable device 100 is of a form appropriate for storing data, and in which the personal portable device 200 is of a form appropriate for editing data, the interactive components 140 and 240 likely both incorporate visual displays capable of displaying text and manually-operable keyboards capable of being used to input text, as depicted in FIG. 3a.

In a manner not unlike the task 900 of FIGS. 1a and 1b, the task 900 of editing data stored on the personal portable device 100 through the personal portable device 200 is divided up into a user interface task portion 901 and a communications task portion 902 initially assigned to be performed by the personal portable device 100; and into a search task portion 904, an edit task portion 905, a communications task portion 206 and a user interface task portion 909 initially assigned to be performed by the personal portable device 200. Not unlike the task portions and routines assigned to the personal portable devices 100 and 200 in FIGS. 1a and 1b, among the personal portable devices 100 and 200 of FIGS. 3a and 3b, the user interface task portion 901, the communications task portion 902, the search task portion 904, the editing task portion 905, the communications task portion 908 and the user interface task portion 909 correspond to various task routines, specifically, a user interface routine 921, a communications routine 922, a search routine 924, an editing routine 925, a communications routine 928 and a user interface routine 929, respectively.

Therefore, as a result of the aforedescribed division and distribution of assignments of portions of the task 900, the processor 110 is initially assigned to execute sequences of instructions of the user interface routine 921 and the communications routine 922, while the processor 210 is initially assigned to execute sequences instructions of the search routine 924, the editing routine 925, the communications routine 928 and the user interface routine 929. As will be explained in greater detail, as a result of diminishing electric power remaining in the power source 215 of the personal portable device 200, one or both of the search task portion 904 and the editing task portion 905 is reassigned be to preformed by the personal portable device 100. As a result, the processor 110 is caused to take over the performance of the decompression task portion 904 and/or the adjusting task portion 905.

In performing the portions of the task 900 initially assigned to the personal portable device 200, the processor 210 is caused by the user interface routine 929 to operate the interactive component 240 to monitor one or more manually-operable controls of the interactive component 240 for an indication from a user that address data 921 stored in the storage 120 of the personal portable device 100 through the personal portable device 200. In response to receiving this indication, the processor 210 is caused by the communications routine 928 to operate the transceiver 230 to signal the personal portable device 100 to transmit a copy of the data 954 across the network 3000 to the personal portable device 200. Upon receipt of this signal from the personal portable device 200, the processor 110 is caused by the communications routine 922 to retrieve the data 954 and to transmit a copy of the data 954 to the personal portable device 200. Upon receipt of the copy of the data 954 from by personal portable device 100, the processor 210 is caused by the edit routine 925 and the search routine 924, along with the user interface routine 929, to operate a keyboard and a visual display of the interactive component 240 to display portions of the copy of the data 954, and to accept user input indicating searches for pieces of text within the copy of the data 954 and indicating edits the user is making to the copy of the data 954. The edit routine 925 causes the processor 210 to create and maintain a temporary data 955 that reflects the edits made by the user to the copy of the data 954, but which the user has not yet committed to or "saved" so as to actually alter the copy of the data 954. At a time when the user has indicated through the interactive component 240 that the user is finished making edits to the copy of the data 954, the edit routine 925 causes the processor to actually make the edits indicated in the temporary data 955 to the copy of the data 954, and then operate the transceiver 230 to transmit the copy of the data 954 back to the personal portable device 100. In response to receiving the now edited copy of the data 954 back from the personal portable device 200, the processor 110 overwrites the data 954 stored in the storage 120 with the now edited copy of the data 954 as the new data 954. In this way, the user of both of the personal portable devices 100 and 200 is able to employ the personal portable device 200 to search and edit the data 954 stored within the personal portable device 100.

In this way, the processors 110 and 210 have been caused to perform various ones of the portions of the task 900 that have been assigned to each of the personal portable devices 100 and 200, and are thereby caused to cooperate to perform the entirety of the task 900. However, as those skilled in the art will readily recognize, the performance of the task portions 901, 902, 904, 905, 908 and 909 (which correspond to the execution of sequences of instructions of each of the routines 921, 922, 924, 925, 928 and 929, respectively) consumes electric power. Further and as previously discussed, the portable nature of the personal portable devices 100 and 200 likely results in the power sources 115 and 215 each being a form of battery (or other electric power storage) able to store a finite amount of electric power and requiring recharging. As the processors 110 and 210 execute sequences of instructions to perform the task 900, the processors 110 and 210 also execute sequences of instructions of power routines 125 and 225 to monitor amounts of electric power remaining in the power sources 115 and 215, respectively.

Therefore, as depicted in FIGS. 3a and 3b, where the processor has been caused by the power routine 225 to determine that the amount of electric power remaining in the power source 215 has been sufficiently diminished, the processor 210 is caused to cooperate with the processor 110 to cause one or both of the task portions 904 and 905 to be reassigned from the personal portable device 200 to the personal portable device 100. In some embodiments, there may be a goal of trying to prevent data loss by taking steps to ensure that edits that the user makes to the copy of the data 954 are not lost due to loss of electric power. In such embodiments, the processors 110 and 210 are caused by the power routines 125 and 225, respectively, to cooperate so that one or both of the task portions 904 and 905 are transferred to the personal portable device 100 to enable the transfer of copy of the data 954 and/or the temporary data 955 to the personal electronic device 100 in an effort to prevent a loss of data. With the task portions 904 and 905 transferred from the personal portable device 200 to the personal portable device 100, the processor 110 is caused to pass on input provided by the user through manually-operable controls of the interactive component 240 to the personal portable device 100 and to display the results as indicated to the personal portable device 200 by the personal portable device 100 on a visual display of the interactive component 240. In other words, the personal portable device 200 essentially functions as a remote terminal of the personal portable device 100.

The determination of how diminished the power source 215 must be to prompt such a transfer may result from calculations that the power routine 225 causes the processor 210 to perform to determine the actual rate at which remaining electric power in the power source 215 are being consumed, and how long the remaining amount of electric power can last. Alternatively, information concerning the consumption of electric power by performing the task portions 904 and 905 may be stored as power data 255. Not unlike the personal portable devices 100 and 200 of FIGS. 2a and 2b, evaluations of remaining operating times for each of the personal portable devices 100 and 200 of FIGS. 3a and 3b prompted by changing circumstances may result in changes the reassignment of task portions 904 and/or 905 between the personal portable devices 100 and 200. Again, the user may couple one or both of the personal portable devices 100 and 200 to an external power source (not shown) that provides an alternative source of electric power for performing the task 900 and/or recharges one or both of the power sources 115 and 215, thereby prompting such a subsequent evaluation. And again, execution of sequences of instructions of one or more routines may be suspended, thereby altering consumption of electric power and prompting a subsequent evaluation.

Where the reassignment of the task portions 904 and 905 have already been carried out, and the amount of electric power remaining in the power source 215 diminishes further to an extent that operation of the personal portable device 200 as a remote terminal of the personal portable device 100 cannot be reliably maintained, the processors 110 and 210 may be caused by the power routines 915 and 925 to cooperate to transition the user to operating the personal portable device 100, directly. The processor 210 may operate a visual display of the interactive component 240 to provide a visual indication that the personal portable device 200 is about to lose power, and/or that the user may continue to edit and/or search for items within the data 954 by directly operating the personal portable device 100. At this point, in an effort to further conserve power to enable this indication to be provided to the user for as long as possible, the processor 210 may cease executing sequences of instructions of the power routine 225.

Figure 4A:
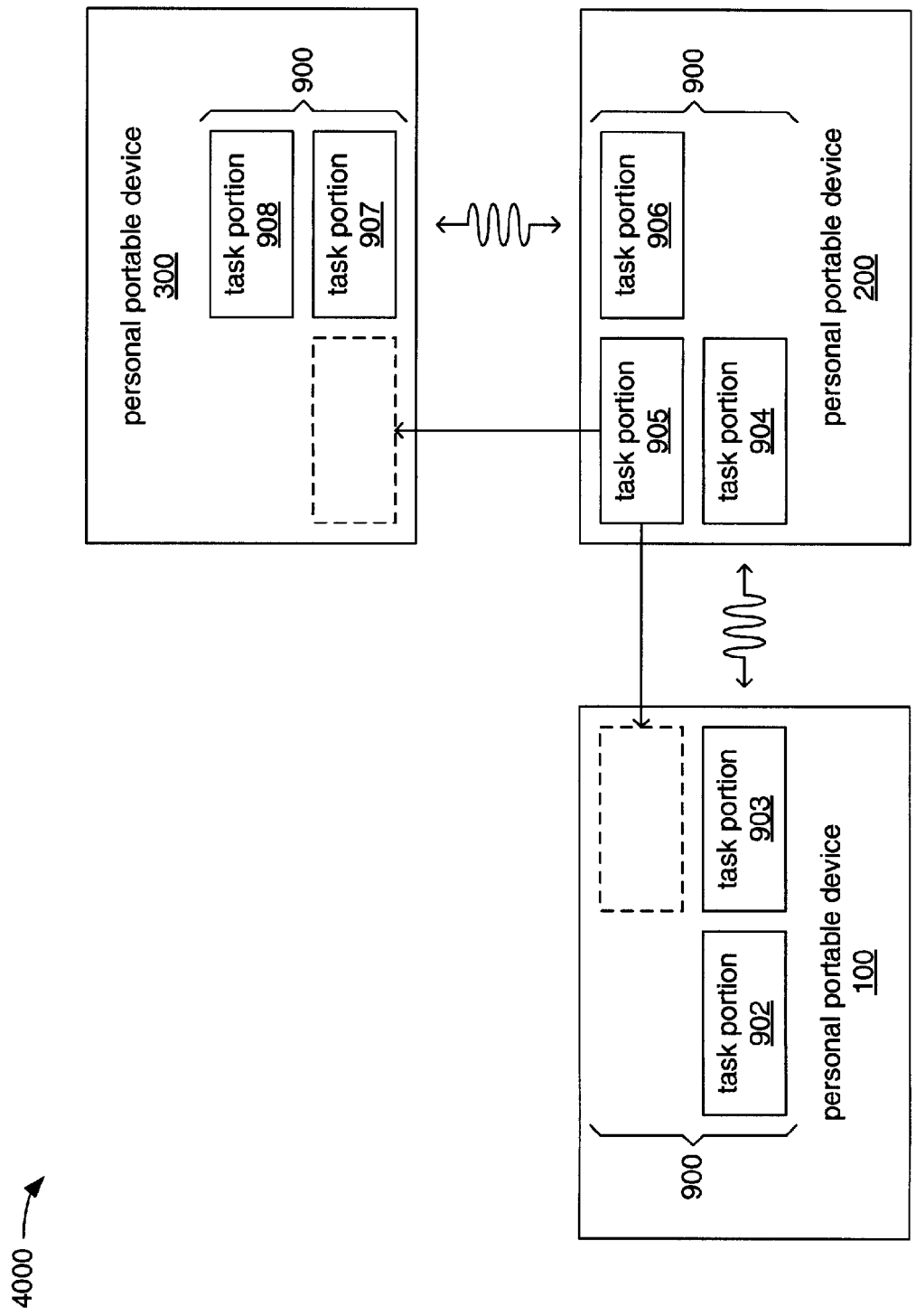
FIG. 4a is a block diagram depicting a reassignment of a task portion between personal portable devices in a network having a chain topology.
Figure 4B:
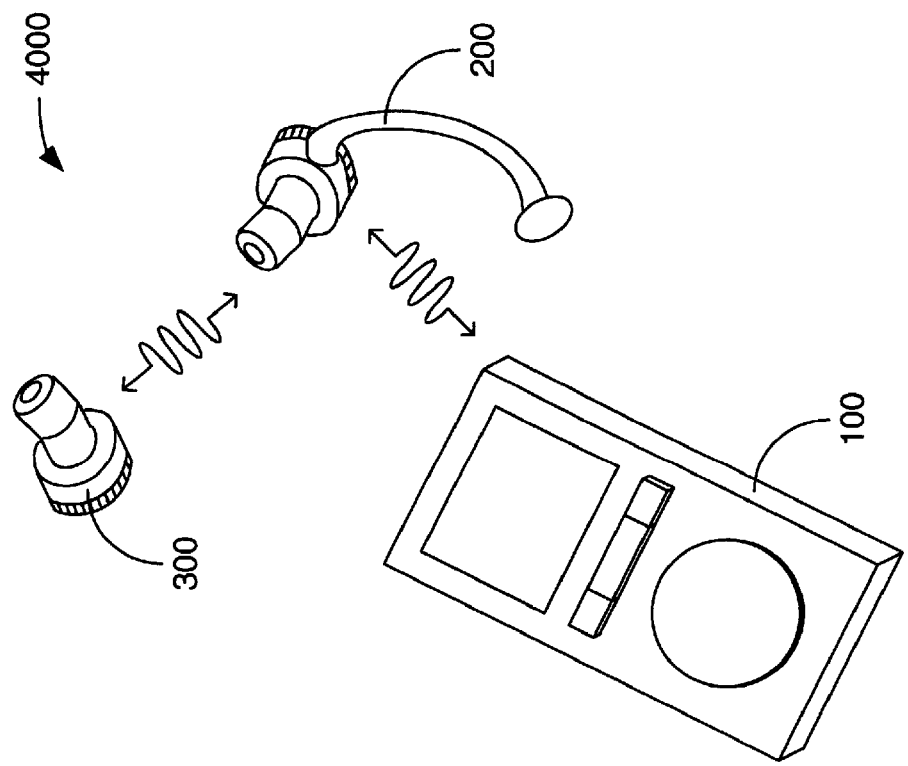
Figure 4C:
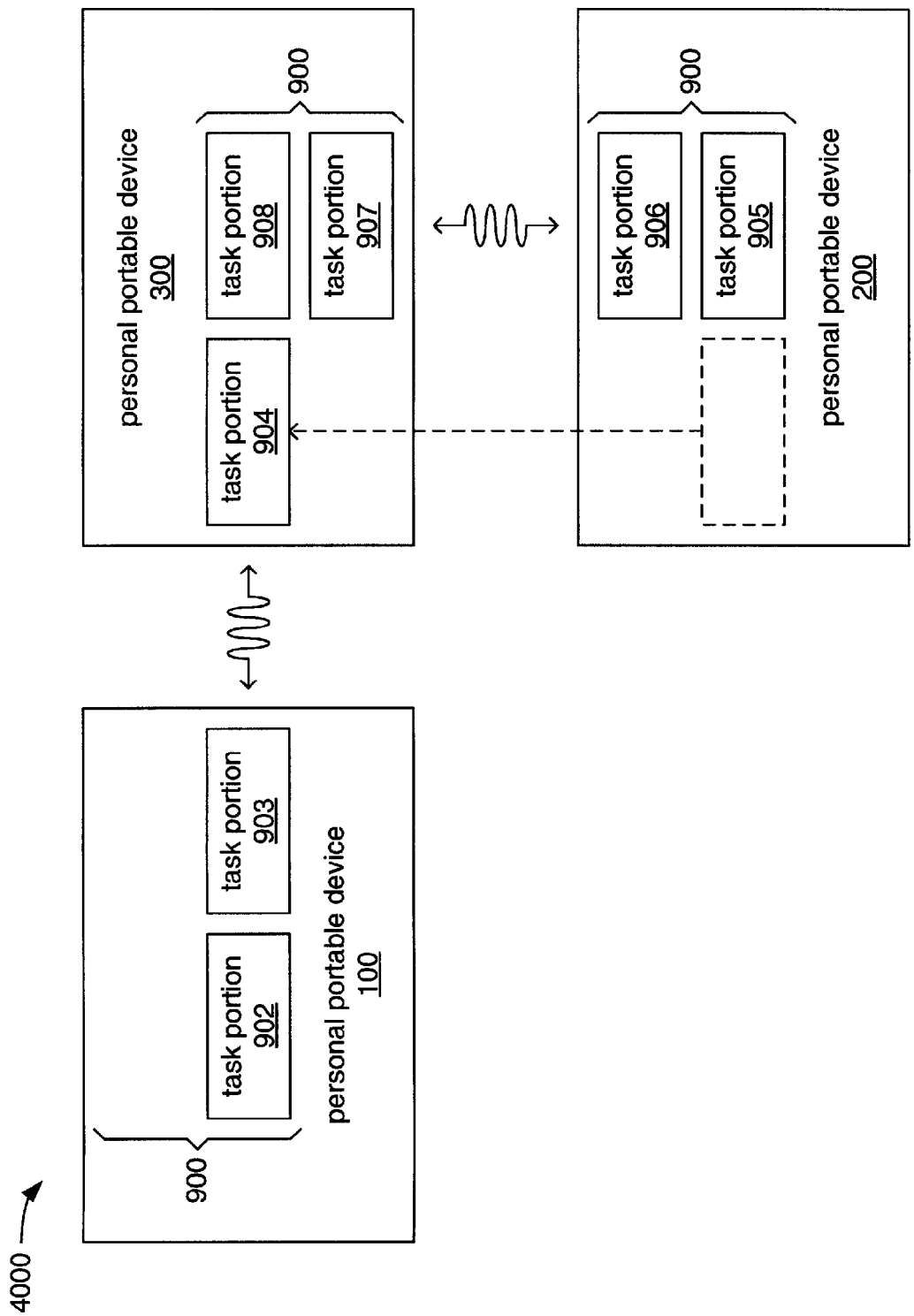
Figure 4D:
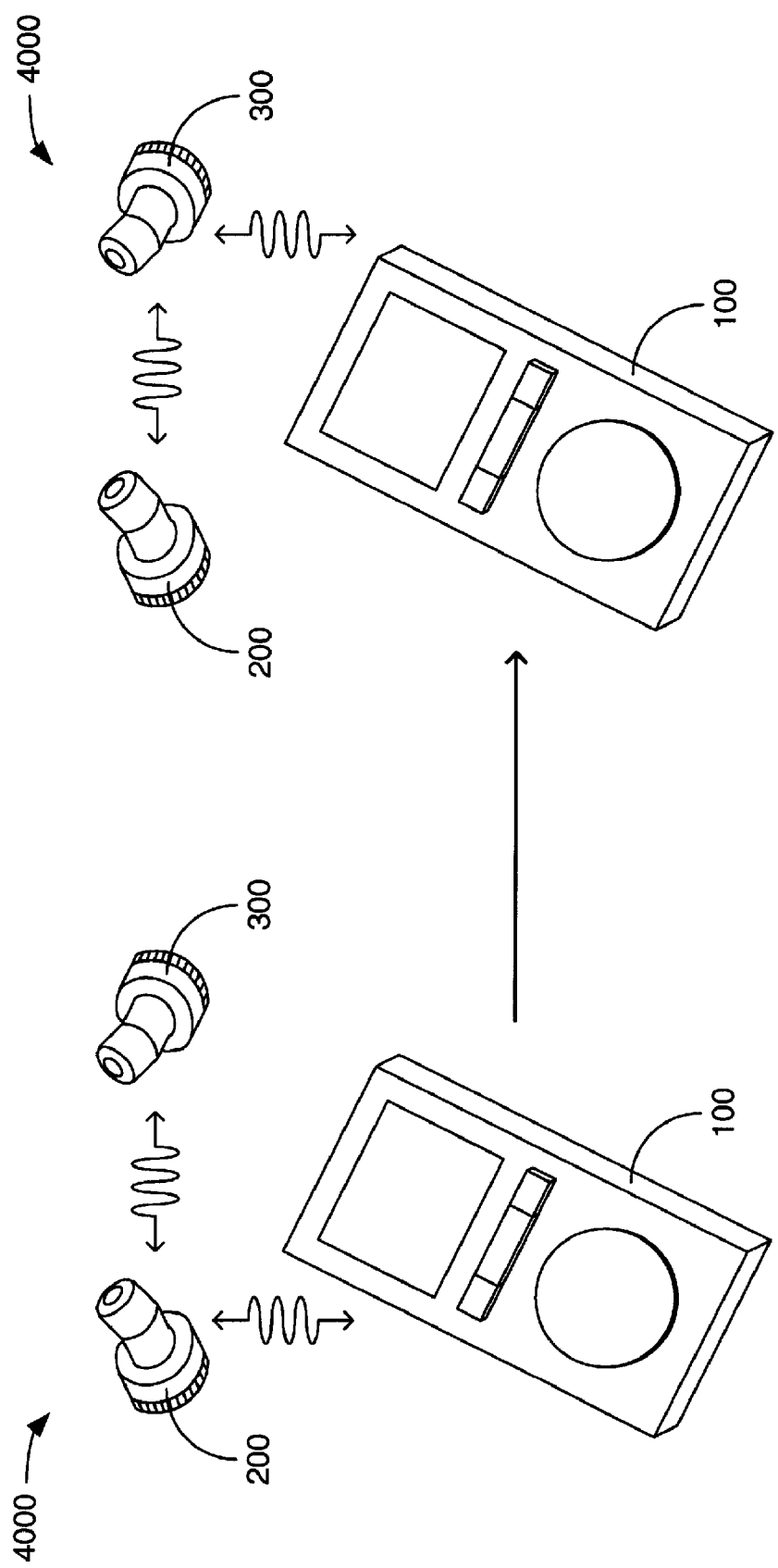
FIG. 4d is a block diagram depicting a more specific example of the reassignment of FIG. 4c.

FIGS. 4a, 4b, 4c and 4d are block diagrams that each depict three personal portable devices 100, 200 and 300 in a chain topology network 4000 cooperating to perform a task 900, but depicting different forms of reassignment of a portion of a task 900 among these three personal portable devices in response to diminishing availability of electric power to the personal portable device 200. FIG. 4a depicts a reassignment of a task portion unrelated to network communications from the personal portable device 200 to either of the personal portable devices 100 and 300. FIG. 4b depicts a more specific example of the form of reassignment of a task portion depicted in FIG. 4a. FIG. 4c depicts a reassignment of a task portion related to network communications from the personal portable device 200 to the personal portable device 300 that results in a change in relative positions of these three personal portable devices in the chain topology of the network 4000. FIG. 4d depicts a more specific example of the form of reassignment of a task portion depicted in FIG. 4c.

Not unlike the personal portable devices 100 and 200 of the network 1000 in FIGS. 1a and 1b, the personal portable devices 100, 200 and 300 of the network 4000 may each be any of a variety of types personal portable device. In a manner not unlike the task 900 depicted in FIGS. 1a and 1b, the task 900 depicted in FIGS. 4a and 4b is divided up into seven task portions 902 through 908, and those task portions are distributed among these three personal portable devices. The task portions 902 and 903 are initially assigned to be performed by the personal portable device 100, the task portions 904, 905 and 906 are initially assigned to be performed by the personal portable device 200, and the task portions 907 and 908 are initially assigned to be performed by the personal portable device 300.

Among the task portions 902 through 908 are task portions related to communications within the network 4000, and there are other task portions that are not related to such communications. The task portions 903 and 904 are related to network communications between the personal portable devices 100 and 200, and the task portions 906 and 907 are related to network communications between the personal portable devices 200 and 300. In contrast, the task portions 902, 905 and 908 are task portions unrelated to network communications. With diminishing remaining available electric power, the personal portable device 200 signals at least one of the personal portable devices 100 and 300 with a request to reassign at least one the task portions 904, 905 and 906 to reduce the rate at which its remaining available electric power is being further diminished. Depending on the nature of the task 900 being performed through the cooperation of the personal portable devices 100, 200 and 300, performing the task portion 905 may entail a rate of electric power consumption that could be considerably greater or considerably less than the rates of electric power consumption entailed in performing the network-related task portions 904 and 906. Relative rates of electric power consumption between the task portions 904, 905 and 906 may be a factor in some embodiments in selecting which of the task portions 904, 905 and 906 to reassign. Alternatively, there may be a preference between reassigning a network-related task portion and reassigning a task portion not related to network communications.

Turning to FIG. 4a, regardless of the manner in which a task portion is selected for reassignment, the task portion 905 is selected to be reassigned to one or the other of the personal portable devices 100 and 300. As the task portion 905 is unrelated to network communications, it is likely that the topology of the network 4000 is not affected by this reassignment. The results of this reassignment is not unlike what has been described, earlier, with regard to reassignments.

Turning to FIG. 4b, the form of reassignment occurring in FIG. 4a is applied to the more specific situation of the personal portable devices 100, 200 and 300 cooperating to perform a task of supporting two-way audio communications in where monaural audio transmitted across the network 4000 by the personal portable device 100 is audibly output to a user through at least one acoustic driver of each of the personal portable devices 200 and 300, and where monaural audio spoken by the user is detected through a microphone of the personal portable device 200 and transmitted back to the personal portable device 100. As depicted, the personal portable device 300 is in the form of a wireless earpiece meant to be at least partially inserted into one ear of the user, the personal portable device 200 is in the form of a wireless headset meant to be at least partially inserted into the user's other ear, and the personal portable device 100 is in the form of an RF device such as a cellular telephone or walkie-talkie.

As those skilled in the art will already recognize, it has become increasingly commonplace for personal portable devices used in audio communications to employ wireless technology conforming to the Bluetooth specification. However, the Bluetooth specification currently has no provision for distributing the transmission of outgoing audio that is part of two-way audio communication such that outgoing audio could be transmitted by one device to multiple other devices. Further, the Bluetooth specification also has no provision for also receiving incoming audio from one of multiple devices to which outgoing audio is being transmitted as part of two-way audio communication. Instead, Bluetooth is currently limited to supporting a bi-directional exchange of audio in two-way audio communications between just only devices. Therefore, there is currently no provision in Bluetooth for enabling the personal portable device 100 to simultaneously transmit audio to both of the personal portable devices 200 and 300 for audible output to both ears of the user while simultaneously receiving incoming audio spoken by the user from the personal portable device 200. To overcome this, the personal portable device 200 falsely presents itself to the personal portable device 100 as being a simple single device having both a microphone and an acoustic driver to support two-way audio communications, without revealing its role in retransmitting audio to another device. This has the effect of inducing the personal portable device 100 to transmit outgoing audio to the personal portable device 200 and receive incoming audio from the personal portable device 200. The personal portable device 200, in turn, retransmits at least the audio received from the personal portable device 100 to the personal portable device 300 to be audibly output to the user.

The fact of the personal portable device 200 performing the network-related task portion of retransmitting audio may be accompanied by the personal portable device 200 performing one or more audio processing task portions, including volume control, noise cancellation and/or processing to avoid occurrences of audible feedback developing between an acoustic driver of the personal portable device 300 and the microphone of the personal portable device 200. However, at a time when the power source of the personal portable device 200 has been diminished to a predetermined level, the personal portable device 200 signals one or both of the personal portable devices 100 and 300 concerning the need to reassign one or more of the audio processing task portions currently being performed by the personal portable device 300 to one or the other of the personal portable devices 100 and 300. Alternatively and/or additionally, diminishing access by the personal portable device 200 to electric power may be responded to by the personal portable device 200 cooperating with one or the other of the personal portable devices 100 and 300 to reassign a network-related task portion, as will now be described with regard to FIGS. 4c and 4d.

Further, a reassignment of one or more task portions may be prompted by the suspension of the performance of one or more task portions. By way of example, where the user chooses to mute the microphone of the personal portable device 200, the task portions of capturing audio spoken by the user, transmitting that audio back to the personal portable device 100, and receiving that audio from the personal portable device 200 all become unnecessary, and execution of sequences of instructions to perform those task portions may be suspended. As a result, the rate of consumption of electric power in one or both of the personal portable devices 100 and 200 changes, and an evaluation of the relative rates of power consumption and/or remaining operating times of the personal portable devices 100 and 200 may be prompted, possibly resulting in a reassignment of one or more task portions.

Turning to FIG. 4c, as an alternative to the reassignment of a task portion not related to network communications, the network-related task portion 904 is selected to be reassigned to the personal portable device 300. With this reassignment, one of the task portions involved in network communications with the personal portable device 100 switches from being performed by the personal portable device 200 to being performed by the personal portable device 300, thereby altering the topology of the network 4000. Prior to this reassignment, the chain topology of the network 4000 with the personal portable device 200 interposed between the other two personal portable devices 100 and 300 resulted in the personal portable device 200 serving to retransmit communications between the personal portable devices 100 and 300. Following this reassignment, the network 4000 continues to have a chain topology, but the relative positions of these three personal portable devices are altered such that the personal portable device 300 is now interposed between the other two personal portable devices 100 and 200, and the personal portable device 300 now serves to retransmit communications between the personal portable devices 100 and 200.

Turning to FIG. 4d, the form of reassignment occurring in FIG. 4c is applied to the more specific situation of the personal portable devices 100, 200 and 300 cooperating to perform a task of audibly outputting audio data stored as audio data in the personal portable device 300 in at least 2-channel form with each of the personal portable devices 100 and 200 audibly outputting at least one audio channel. The personal portable devices 200 and 300 each incorporate at least one acoustic driver to each audibly output at least one audio channel of the audio data as the audio data is transmitted across the network 4000 by the personal portable device 100. As depicted, each of the personal portable devices 200 and 300 are in the form of wireless earpieces meant to be at least partially inserted into separate ears of a user.

As was the case with the use of Bluetooth in the situation depicted in FIG. 4b, FIG. 4d depicts another use of retransmission of audio in a chain network topography to overcome a limitation of Bluetooth. More specifically, the Bluetooth specification currently has no provision for the simultaneous separate transmission of differing audio channels of a single piece of audio to separate devices. Instead, Bluetooth is currently limited to supporting only the transmission of all channels of a single piece of audio in a single transmission from one device to another. Therefore, there is currently no provision in Bluetooth for enabling the personal portable device 100 to separately transmit left and right audio channels (for example) to each of the personal portable devices 100 and 200 for being separately audibly output into each ear of the user. To overcome this, the personal portable device 200 falsely presents itself to the personal portable device 100 as being a single device capable of audibly outputting both of the left and right audio channels. This has the effect of inducing the personal portable device 100 to transmit both the left and right audio channels of the piece of audio to the personal portable device 200. The personal portable device 200 then retransmits at least one, if not both of the left and right audio channels to the personal portable device 300, with each of the personal portable devices 200 and 300 audibly outputting a separate one of the left and right audio channels.

As a result, one of the task portions of this task of audibly outputting both left and right audio channels to the ears of the user that is initially assigned to the personal portable device 200 is that of retransmitting audio to the personal portable device 300. However, as those skilled in the art will readily recognize, radio frequency transmission can consume electric power at a considerable rate, and especially given that the personal portable device 300 only receives audio and does not retransmit it, it is likely that the power source of the personal portable device 200 is being diminished considerably more quickly than that of the personal portable device 300. When the power source of the personal portable device 200 has been diminished to a predetermined level, the personal portable device 200 signals the personal portable device 300 of the need to reassign the task portion of retransmitting audio to the personal portable device 300. In response, the personal portable device 300 cooperates with the personal portable device 200 to effectively trade their relative positions in the chain topology of the network 4000 such that the personal portable device 300 places itself in the middle of the chain between the personal portable devices 100 and 200 such that the personal portable device 300 now receives the audio transmitted by the personal portable device 100 and retransmits audio to the personal portable device 200. By trading positions in this manner, it is possible to continue performing the task of separately audibly outputting the left and right audio channels for a longer period of time by spreading the consumption of electric power for the retransmission task portion between the personal portable devices 200 and 300.

As an alternative to trading positions in the topology of the network 4000, or perhaps in addition to doing so, the personal portable device 200 may reassign one or more audio data processing tasks to one or both of the personal portable devices 100 and 300. By way of example, the personal portable device 200 may have initially been assigned the task portion of controlling the volume, bass, treble, left-to-right balance, and/or other characteristics of the audio being audibly output as directed by the user by either directly modifying the audio data to effect those changes or remotely directing such modifications being effected by one or both of the personal portable devices 100 and 300. With the diminishing of remaining available electric power to the personal portable device 200, the personal portable device 200 may signal one or both of the personal portable devices 100 and 300 with the need to reassign such a task portion. In a somewhat similar manner, the personal portable device 100 may respond to diminishing remaining available electric power by requesting to reassign a task portion entailing the decompressing of the audio data stored on the personal portable device 100 in preparation for transmission.

Although such a reassignment of audio processing task portions and/or network-related task portions may extend the operating times of each of the personal portable devices 100, 200 and 300, there may still come a point where the remaining available electric power for one of these personal portable devices is sufficiently diminished that it can no longer participate in this task. Where the personal portable device 100 succumbs to this situation, the task may be caused to continue by the personal portable device 100 transmitting an extended portion of the audio data to be stored by one or both of the personal portable devices 200 and 300 such that audible output may continue for some period of time after the personal portable device 100 ceases to participate in performing the task. Where one of the personal portable devices 200 and 300 succumbs to this situation, the task may be caused to partly continue by the other of these two personal portable devices continuing to receive audio from the personal portable device 100 and audibly outputting both the left and right channels of that audio into one ear of the user.

Figure 5A:
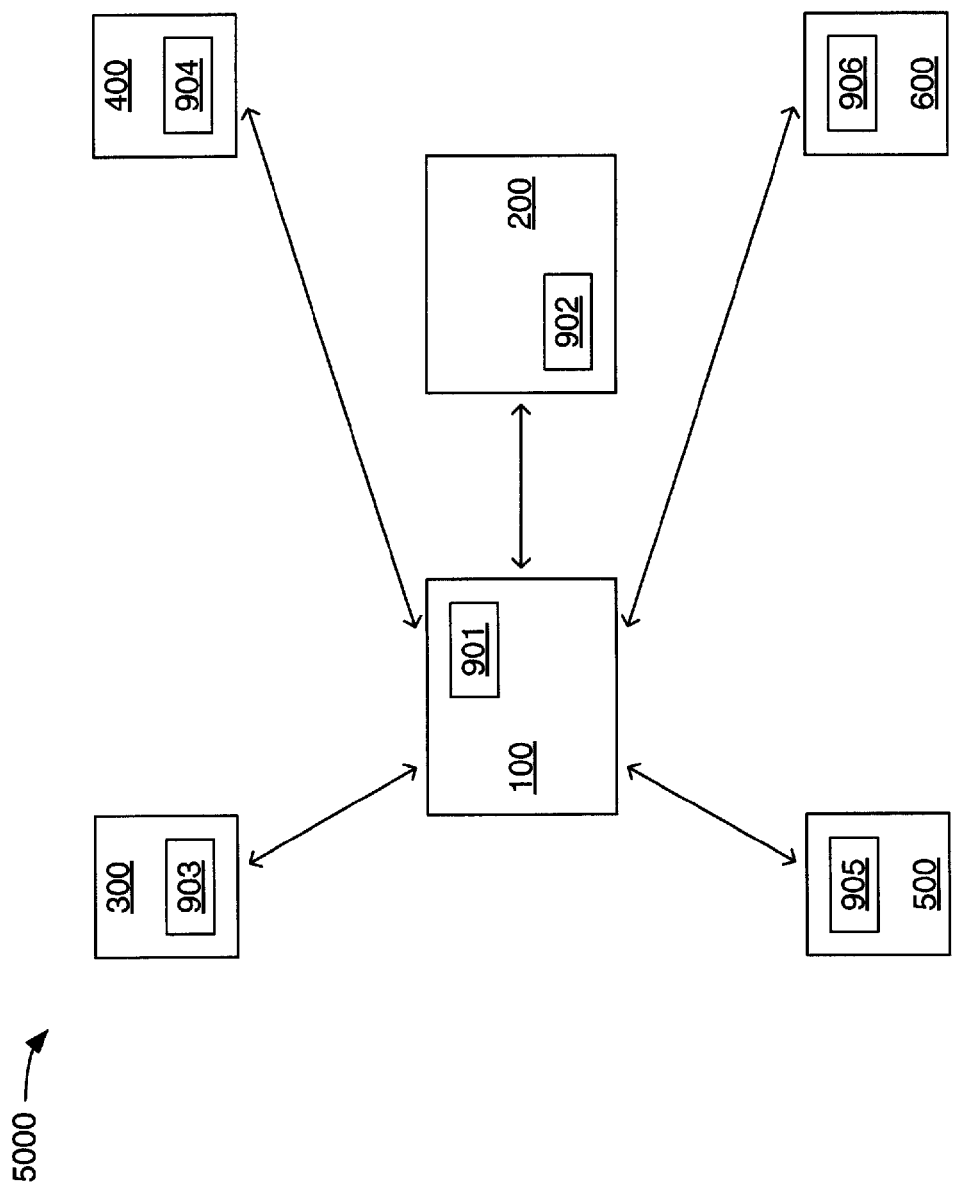
FIGS. 5a and 5b are block diagrams that together depict a reassignment of two tasks between two devices in a network having a star topology.
Figure 5B:
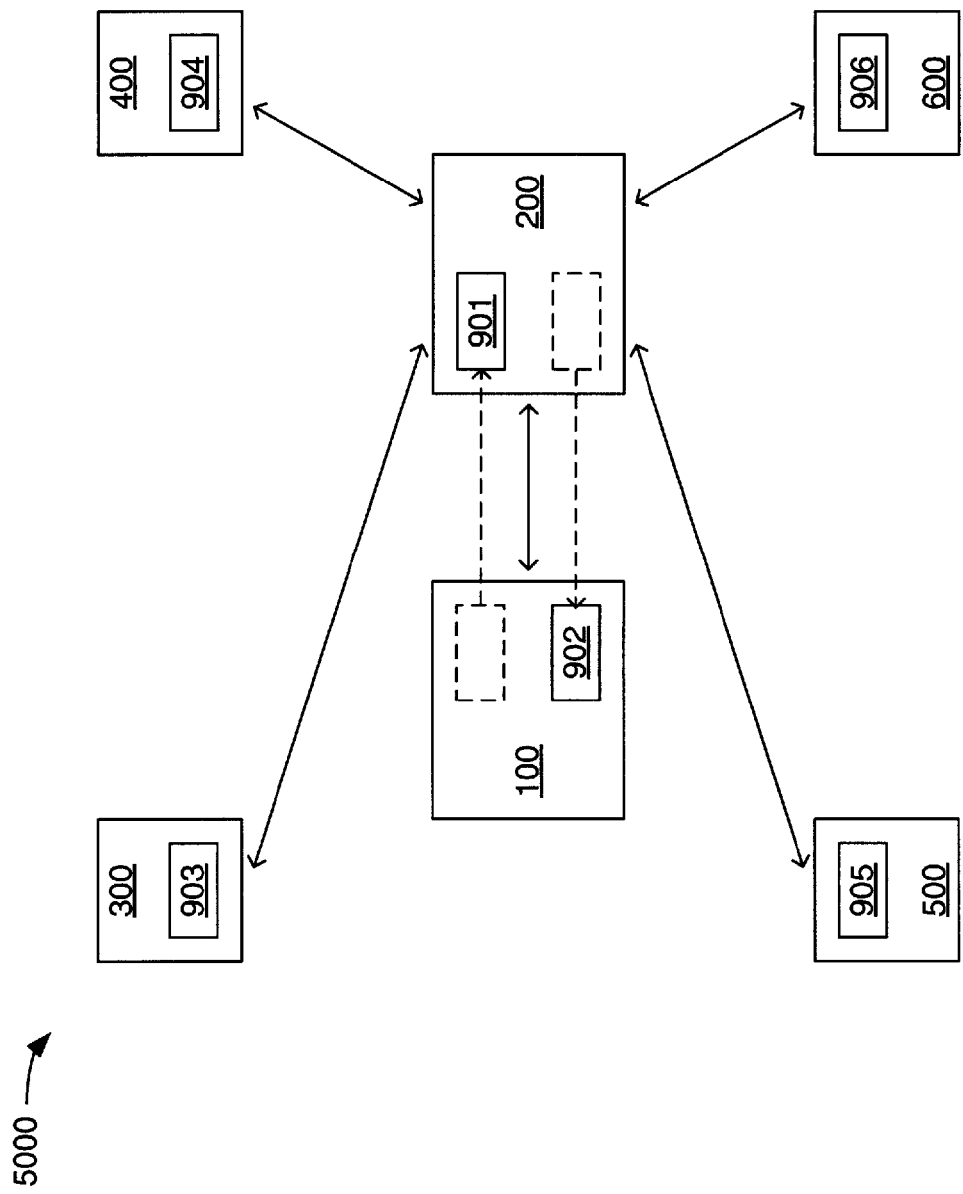

FIGS. 5a and 5b are block diagrams depicting six personal portable devices 100, 200, 300, 400, 500 and 600 in a star topology network 5000 cooperating to perform a task 900. FIG. 5a depicts an initial assignment of task portions among these six personal portable devices. FIG. 5b depicts the reassignment of two of the task portions between the personal portable devices 100 and 200 in response to diminishing availability of electric power to the personal portable device 100 that results in a change in the relative positions of these six personal portable devices in the star topology of the network 5000.

Not unlike the personal portable devices 100 and 200 of the network 1000 in FIGS. 1a and 1b, the personal portable devices 100, 200, 300, 400, 500 and 600 of the network 5000 may each be any of a variety of types personal portable device. In a manner not unlike the task 900 depicted in FIGS. 1a and 1b, a task 900 is divided up into six task portions 901, 902, 903, 904, 905 and 906 that are initially assigned to be performed by the personal portable devices 100, 200, 300, 400, 500 and 600, respectively.

Among the task portions 901 through 906 are task portions related to communications within the network 5000. More specifically, the task portion 901 is related to network communication between the personal portable device 100 and the other five personal portable devices 200 through 600, which corresponds to the personal portable device 100 being at the center of the network 5000. Further, the task portion 902 is related to network communications between the personal portable devices 100 and 200, which corresponds to the personal portable device 200 being at one of the endpoints of the network 5000. As those skilled in the art will readily recognize, the task portion 901 differs significantly from the task portions 902 through 906 insofar as the task portion 901 entails communications with five other devices while the each of the task portions 902 through 906 entail communications with only one other device, and therefore, it follows that performing the task portion 901 necessarily consumes electric power at a greater rate than performing any of the other task portions 902 through 906.

With diminishing available electric power remaining, the personal portable device 100 signals at least one of the other personal portable devices 200 through 600 with a request to reassign the task portion 901 to reduce the rate at which its available electric power is being further diminished. As can be seen from comparing FIGS. 5a and 5b, the task portion 901 is reassigned from the personal portable device 100 to the personal portable device 200. However, unlike earlier-discussed reassignments of even network-related task portions, in order to preserve the integrity of the network 5000, this reassignment of the task portion 901 is accompanied by a reassignment of the task portion 902 from the personal portable device 200 to the personal portable device 100. In essence, the task portions 901 and 902 are "swapped" between the personal portable devices 100 and 200. As a result of this corresponding pair of reassignments, the center and endpoint positions of the personal portable devices 100 and 200 are exchanged, while the star topology of the network 5000 is maintained.

Other embodiments are within the scope of the following claims.

What is claimed is:

1. A personal portable device assigned to perform a first task portion and a second task portion of a task comprising a plurality of task portions, the personal portable device comprising:

a wireless transceiver to enable communications across a wireless network with another personal portable device;

a processor; and a storage in which is stored a first power routine comprising a sequence of instructions, that when executed by the processor, causes the processor to:

monitor a remaining amount of electric power available to the personal portable device from a power source;

operate the wireless transceiver to signal the other personal portable device through the wireless network with a request to reassign execution of at least one of a first task routine stored in the storage that corresponds to the first task portion and a second task routine stored in the storage that corresponds to the second task portion in response to the remaining amount of electric power available to the personal portable device from the power source diminishing to a predetermined level;

receive a signal from the other personal portable device accepting the request to reassign execution of at least one of the first task routine and the second task routine to the other personal portable device;

determine an identity of the other personal portable device;

determine whether it is permissible to transmit a copy of the first task routine to the other personal portable device and whether it is permissible to transmit a copy of the second task routine to the other personal portable device in response to the identity of the other personal portable device; and transmit a copy of the first task routine to the other personal portable device through the wireless network in response to determining that it is permissible to transmit a copy of the first task routine to the other personal portable device and that it is not permissible to transmit a copy of the second task routine to the other personal portable device.

2. The personal portable device of claim 1, wherein the storage stores a first power data indicating a first rate of consumption of electric power associated with executing the first task routine and a second rate of consumption of electric power associated with executing the second task routine.

3. The personal portable device of claim 2, wherein the processor is further caused to select one of the first task portion and the second task portion to be reassigned in response to a result of comparing the first rate to the second rate.

4. The personal portable device of claim 2, wherein the first rate and the second rate are derived by the processor from observations of rates at which electric power is consumed during the execution of the first task routine and the second task routine.

5. The personal portable device of claim 2, wherein the processor is further caused to:

receive an indication through the wireless network from the other personal portable device of at least one of a remaining amount of electric power available to the other personal portable device, a rate at which the electric power available to the other personal portable device is consumed, a first additional rate at which the electric power available to the other personal portable device will be consumed if the first task portion is reassigned to the other personal portable device, and a second additional rate at which the electric power available to the other personal portable device will be consumed if the second task portion is reassigned to the other personal portable device; and select one of the first task portion and the second task portion to be reassigned to the other personal portable device depending on whether increasing the rate at which the electric power available to the other personal portable device is consumed by the first additional rate or the second additional rate will result in the smallest difference between a remaining operating time of the personal portable device and a remaining operating time of the other personal portable device.

6. The personal portable device of claim 1, wherein the second task routine is an audio processing routine, that when executed by the processor, causes the processor to alter a characteristic of a piece of audio data.

7. The personal portable device of claim 1, wherein the processor is further caused to:

receive a signal from the other personal portable device accepting the request to reassign execution of at least one of the first task routine and the second task routine to the other personal portable device; and transmit a signal to the other personal portable device through the network to coordinate a commencement of execution of another task routine analogous to the first task routine by a processor of the other personal portable device with a cessation of execution of the first task routine by the processor of the personal portable device.

8. A method comprising:

causing a first processor of a first personal portable device to execute a first sequence of instructions of a first task routine stored in a first storage of the first personal portable device and associated with a first task portion of a task having a plurality of task portions distributed among at least the first personal portable device and a second personal portable device linked by a wireless network;

causing the first processor to execute a second sequence of instructions of a second task routine stored in the first storage and associated with a second task portion of the task;

monitoring a remaining amount of electric power available to the first personal portable device from a first power source;

causing the first personal portable device to signal at least the second personal portable device through the wireless network with a request to reassign execution of at least one of the first task routine and the second task routine in response to the remaining amount of electric power available to the first personal portable device from the first power source diminishing to a first predetermined level;

comparing identities of the first and second personal portable devices;

determining whether it is permissible to transmit a copy of the first task routine from the first personal portable device to the second personal portable device and whether it is permissible to transmit a copy of the second task routine from the first personal portable device to the second personal portable device in response to the identity of the second personal portable device; and transmitting a copy of the first task routine from the first personal portable device to the second personal portable device through the wireless network in response to determining that it is permissible to transmit a copy of the first task routine to the second personal portable device and that it is not permissible to transmit a copy of the second task routine to the second personal portable device.

9. The method of claim 8, further comprising:

comparing a first rate of consumption of the remaining amount of electric power available to the first personal portable device due to first processor executing the first task routine to a second rate of consumption of electric power available to the first personal portable device due to the first processor executing the second task routine; and selecting to reassign execution of one or the other of the first task routine and the second task routine from the first personal portable device to the second personal portable device based on whether the first rate or the second rate is greater.

10. The method of claim 8, further comprising:

monitoring a remaining amount of electric power available to the second personal portable device from a second power source; and selecting one of the first task portion and the second task portion to be reassigned from the first personal portable device to the second personal portable device depending on whether execution of the first task routine by a second processor of the second personal portable device or execution of the second task routine by the second processor will decrease a rate of consumption of the remaining amount of electric power available to the first personal portable device and increase a rate of consumption of the remaining amount of electric power available to the second personal portable device will result in the smallest difference between a remaining operating time of the first personal portable device and a remaining operating time of the second personal portable device.

11. The method of claim 8, further comprising:

monitoring a remaining amount of electric power available to the second personal portable device from a second power source; and causing the second personal portable device to signal at least the first personal portable device through the wireless network with a request to reassign execution of at least one task routine in response to the remaining amount of electric power available to the second personal portable device from the second power source diminishing to a second predetermined level.

12. The method of claim 8, wherein the second task routine is an audio processing routine, when executed by the processor, causes the processor to alter a characteristic of a piece of audio data.

13. The method of claim 8, wherein the wireless network has a chain topology having one end and another end, wherein the second personal portable device is at the one end of the chain, wherein a third personal portable device is at the another end of the chain, wherein the first personal portable device is along the chain between the second and third personal portable devices and relays commands and data between the second and third personal portable devices, wherein the first task routine causes the first processor to communicate across a point-to-point link formed between the first personal portable device and the third personal portable device as part of the wireless network, and further comprising reassigning execution of the first task routine from the first processor to a second processor of the second personal portable device such that the first and second personal portable devices exchange positions along the chain of the wireless network.

14. The method of claim 13, wherein the task is audibly outputting separate audio channels by the first and second personal portable devices of audio stored as audio data within the third personal portable device, wherein one of the first and second personal portable devices retransmits the audio data received from the third personal portable device to the other of the first and second personal portable devices.

15. The method of claim 8, wherein the wireless network has a star topology having a center and plurality of endpoints; wherein the first personal portable device is at the center, wherein the second personal portable device is at an endpoint of the plurality of endpoints; wherein a plurality of other personal portable devices are each at another endpoint of the plurality of endpoints; wherein the first task routine causes the first processor to relay commands and data among the first personal portable device, the second personal portable device and the plurality of other personal portable devices as part of coordination communication throughout the wireless network; and further comprising reassigning execution of the first task routine from the first processor to a second processor of the second personal portable device such that the first and second personal portable devices exchange center and endpoint positions within the wireless network.

16. The method of claim 8, further comprising:

monitoring a remaining amount of electric power available to the second personal portable device from a second power source; and causing the second personal portable device to signal at least the first personal portable device through the wireless network with a request to reassign execution of at least one task routine in response to the remaining amount of electric power available to the second personal portable device from the second power source changing as a result of the second personal portable device being coupled to an external power source.

17. The method of claim 8, further comprising causing the second personal portable device to signal the first personal portable device through the wireless network indicating acceptance of the request to reassign execution of at least one of the first task routine and the second task routine to the second personal portable device in response to a suspension of execution of a third task routine by a processor of the second personal portable device.

18. A personal portable device assigned to perform a first task portion and a second task portion of a task comprising a plurality of task portions, the personal portable device comprising:
   a wireless transceiver to enable communications across a wireless network with another personal portable device;
   a processor; and
   a storage in which is stored a first power routine comprising a sequence of instructions, that when executed by the processor, causes the processor to:
      monitor a remaining amount of electric power available to the personal portable device from a power source;
      operate the wireless transceiver to signal the other personal portable device through the wireless network with a request to reassign execution of at least one of a first task routine stored in the storage that corresponds to the first task portion and a second task routine stored in the storage that corresponds to the second task portion in response to the remaining amount of electric power available to the personal portable device from the power source diminishing to a predetermined level
      receive a signal from the other personal portable device accepting the request to reassign execution of at least one of the first task routine and the second task routine to the other personal portable device;
      determine an identity of the other personal portable device;
      determine whether it is permissible to transmit a copy of a first data associated with the first task routine to the other personal portable device and whether it is permissible to transmit a copy of a second data associated with the second task routine to the other personal portable device in response to the identity of the other personal portable device; and
      transmit a copy of the first data to the other personal portable device through the wireless network in response to determining that it is permissible to transmit a copy of the first data to the other personal portable device and that it is not permissible to transmit a copy of the second data to the other personal portable device.

19. The personal portable device of claim 18, wherein the storage stores a first power data indicating a first rate of consumption of electric power associated with executing the first task routine and a second rate of consumption of electric power associated with executing the second task routine.

20. The personal portable device of claim 19, wherein the processor is further caused to select one of the first task portion and the second task portion to be reassigned in response to a result of comparing the first rate to the second rate.

21. The personal portable device of claim 19, wherein the first rate and the second rate are derived by the processor from observations of rates at which electric power is consumed during the execution of the first task routine and the second task routine.

22. The personal portable device of claim 19, wherein the processor is further caused to:
   receive an indication through the wireless network from the other personal portable device of at least one of a remaining amount of electric power available to the other personal portable device, a rate at which the electric power available to the other personal portable device is consumed, a first additional rate at which the electric power available to the other personal portable device will be consumed if the first task portion is reassigned to the other personal portable device, and a second additional rate at which the electric power available to the other personal portable device will be consumed if the second task portion is reassigned to the other personal portable device; and
   select one of the first task portion and the second task portion to be reassigned to the other personal portable device depending on whether increasing the rate at which the electric power available to the other personal portable device is consumed by the first additional rate or the second additional rate will result in the smallest difference between a remaining operating time of the personal portable device and a remaining operating time of the other personal portable device.

23. The personal portable device of claim 18, wherein the processor is further caused to:
   receive a signal from the other personal portable device accepting the request to reassign execution of at least one of the first task routine and the second task routine to the other personal portable device; and
   transmit a signal to the other personal portable device through the network to coordinate a commencement of execution of another task routine analogous to the first task routine by a processor of the other personal portable device with a cessation of execution of the first task routine by the processor of the personal portable device.

24. The personal portable device of claim 18, wherein the second data is a piece of audio data.

25. A method comprising:
   causing a first processor of a first personal portable device to execute a first sequence of instructions of a first task routine stored in a first storage of the first personal portable device and associated with a first task portion of a task having a plurality of task portions distributed among at least the first personal portable device and a second personal portable device linked by a wireless network;
   causing the first processor to execute a second sequence of instructions of a second task routine stored in the first storage and associated with a second task portion of the task;
   monitoring a remaining amount of electric power available to the first personal portable device from a first power source;
   causing the first personal portable device to signal at least the second personal portable device through the wireless network with a request to reassign execution of at least one of the first task routine and the second task routine in response to the remaining amount of electric power available to the first personal portable device from the first power source diminishing to a first predetermined level;
comparing identities of the first and second personal portable devices;
determining whether it is permissible to transmit a copy of a first data associated with the first task routine from the first personal portable device to the second personal portable device and whether it is permissible to transmit a copy of a second data associated with the second task routine from the first personal portable device to the second personal portable device in response to the identity of the second personal portable device; and
transmitting a copy of the first data from the first personal portable device to the second personal portable device through the wireless network in response to determining that it is permissible to transmit a copy of the first data to the second personal portable device and that it is not permissible to transmit a copy of the second data to the second personal portable device.

26. The method of claim 25, further comprising:
comparing a first rate of consumption of the remaining amount of electric power available to the first personal portable device due to first processor executing the first task routine to a second rate of consumption of electric power available to the first personal portable device due to the first processor executing the second task routine; and
selecting to reassign execution of one or the other of the first task routine and the second task routine from the first personal portable device to the second personal portable device based on whether the first rate or the second rate is greater.

27. The method of claim 25, further comprising:
monitoring a remaining amount of electric power available to the second personal portable device from a second power source; and
selecting one of the first task portion and the second task portion to be reassigned from the first personal portable device to the second personal portable device depending on whether execution of the first task routine by a second processor of the second personal portable device or execution of the second task routine by the second processor will decrease a rate of consumption of the remaining amount of electric power available to the first personal portable device and increase a rate of consumption of the remaining amount of electric power available to the second personal portable device will result in the smallest difference between a remaining operating time of the first personal portable device and a remaining operating time of the second personal portable device.

28. The method of claim 25, further comprising:
monitoring a remaining amount of electric power available to the second personal portable device from a second power source; and
causing the second personal portable device to signal at least the first personal portable device through the wireless network with a request to reassign execution of at least one task routine in response to the remaining amount of electric power available to the second personal portable device from the second power source diminishing to a second predetermined level.

29. The method of claim 25, wherein the second data is a piece of audio data.

30. The method of claim 25, wherein the wireless network has a chain topology having one end and another end, wherein the second personal portable device is at the one end of the chain, wherein a third personal portable device is at the another end of the chain, wherein the first personal portable device is along the chain between the second and third personal portable devices and relays commands and data between the second and third personal portable devices, wherein the first task routine causes the first processor to communicate across a point-to-point link formed between the first personal portable device and the third personal portable device as part of the wireless network, and further comprising reassigning execution of the first task routine from the first processor to a second processor of the second personal portable device such that the first and second personal portable devices exchange positions along the chain of the wireless network.

31. The method of claim 30, wherein the task is audibly outputting separate audio channels by the first and second personal portable devices of audio stored as audio data within the third personal portable device, wherein one of the first and second personal portable devices retransmits the audio data received from the third personal portable device to the other of the first and second personal portable devices.

32. The method of claim 25, wherein the wireless network has a star topology having a center and plurality of endpoints; wherein the first personal portable device is at the center, wherein the second personal portable device is at an endpoint of the plurality of endpoints; wherein a plurality of other personal portable devices are each at another endpoint of the plurality of endpoints; wherein the first task routine causes the first processor to relay commands and data among the first personal portable device, the second personal portable device and the plurality of other personal portable devices as part of coordination communication throughout the wireless network; and further comprising reassigning execution of the first task routine from the first processor to a second processor of the second personal portable device such that the first and second personal portable devices exchange center and endpoint positions within the wireless network.

33. The method of claim 25, further comprising:
monitoring a remaining amount of electric power available to the second personal portable device from a second power source; and
causing the second personal portable device to signal at least the first personal portable device through the wireless network with a request to reassign execution of at least one task routine in response to the remaining amount of electric power available to the second personal portable device from the second power source changing as a result of the second personal portable device being coupled to an external power source.

34. The method of claim 25, further comprising causing the second personal portable device to signal the first personal portable device through the wireless network indicating acceptance of the request to reassign execution of at least one of the first task routine and the second task routine to the second personal portable device in response to a suspension of execution of a third task routine by a processor of the second personal portable device.

* * * * *